United States Patent
Taherzadeh Boroujeni et al.

(10) Patent No.: US 12,256,394 B2
(45) Date of Patent: Mar. 18, 2025

(54) PHYSICAL UPLINK CONTROL CHANNEL (PUCCH) REPETITION FACTOR ASSOCIATED WITH A PUCCH RESOURCE INDICATOR (PRI)

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Fairless Hills, PA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/649,049

(22) Filed: Jan. 26, 2022

(65) Prior Publication Data

US 2022/0248445 A1 Aug. 4, 2022

Related U.S. Application Data

(60) Provisional application No. 63/144,609, filed on Feb. 2, 2021, provisional application No. 63/144,418, filed on Feb. 1, 2021.

(51) Int. Cl.
*H04W 72/12* (2023.01)
*H04W 72/21* (2023.01)
(Continued)

(52) U.S. Cl.
CPC .......... *H04W 72/21* (2023.01); *H04W 72/23* (2023.01); *H04W 72/542* (2023.01)

(58) Field of Classification Search
CPC . H04W 72/23; H04W 72/0446; H04W 72/21; H04W 74/0833; H04L 1/08;
(Continued)

(56) References Cited

U.S. PATENT DOCUMENTS 11,044,746 B2 * 6/2021 Chien .................. H04L 1/1861
11,382,076 B2 * 7/2022 Cheng .................. H04W 72/23
(Continued)

FOREIGN PATENT DOCUMENTS

EP         3833094 A1      6/2021
WO    WO-2020026291 A1    2/2020

OTHER PUBLICATIONS

International Search Report and Written Opinion—PCT/US2022/014100—ISA/EPO—Apr. 26, 2022.
(Continued)

*Primary Examiner* — Jung Liu
(74) *Attorney, Agent, or Firm* — Norton Rose Fulbright US LLP

(57) ABSTRACT

This disclosure provides systems, methods, and apparatuses, including computer programs encoded on computer storage media, for supporting a physical uplink control channel (PUCCH) resource indicator (PRI). In some aspects, a PUCCH repetition factor is dynamically indicated that is applicable to multiple PUCCHs or multiple PUCCH types. For example, an apparatus receives downlink control information (DCI) that schedules a first PDSCH and includes a PRI indicating a repetition factor of a first PUCCH associated with the first PDSCH and at least one additional PUCCH. In some other aspects, the PRI includes a repetition indicator associated with a repetition factor, such as a PUCCH repetition factor. In one aspect, a repetition indicator associated with a repetition factor is included in DCI and the repetition indicator is associated with multiple PUCCH types.

30 Claims, 11 Drawing Sheets

(51) Int. Cl.
*H04W 72/23* (2023.01)
*H04W 72/542* (2023.01)

(58) Field of Classification Search
CPC ... H04L 1/1896; H04L 1/1819; H04L 1/1671; H04L 1/1854; H04L 5/0048; H04L 5/0007; H04L 1/1861; H04L 5/1469; H04L 1/0006; H04L 1/1858; H04L 5/0091; Y02D 30/70
See application file for complete search history.

(56) References Cited

U.S. PATENT DOCUMENTS

| | | | | |
|---|---|---|---|---|
| 11,464,035 | B2* | 10/2022 | Choi | H04W 72/1268 |
| 11,638,240 | B2* | 4/2023 | Park | H04L 1/1671 370/336 |
| 2020/0205150 | A1* | 6/2020 | Cheng | H04W 72/21 |
| 2020/0383105 | A1* | 12/2020 | Park | H04L 1/1896 |
| 2022/0116968 | A1* | 4/2022 | Choi | H04W 72/1268 |
| 2022/0150942 | A1* | 5/2022 | Xu | H04W 72/0446 |
| 2022/0225363 | A1* | 7/2022 | Shim | H04W 72/1268 |
| 2022/0346092 | A1* | 10/2022 | Choi | H04L 5/1469 |
| 2022/0346093 | A1* | 10/2022 | Choi | H04L 1/1854 |
| 2023/0262712 | A1* | 8/2023 | Park | H04W 72/23 370/336 |
| 2024/0089026 | A1* | 3/2024 | Bhamri | H04L 1/08 |

OTHER PUBLICATIONS

Vivo: "Discussion on Multi PDCCH Based Multi TRP Transmission", 3GPP Draft, 3GPP TSG RAN WG1 Ad-Hoc Meeting 1901, R1-1900137_Discussion on Multi PDCCH Based Multi TRP Transmission_Final, 3rd Generation Partnership Project (3GPP), Mobile Competence Centre, 650, Route Des Lucioles, F-06921 Sophia-Antipolis Cedex, France, vol. Ran WG1, No. Taipei, 20190121-20190125, 15 Pages, Jan. 12, 2019 (Jan. 12, 2019), XP051575761, Retrieved from the Internet: URL: http://www.3gpp.org/ftp/tsg%5Fran/WG1%5FRL1/TSGR1%5FAH/NR%5FAH%5F1901/Docs/R1%2D1900137%2Ezip [retrieved on Jan. 12, 2019], section 5, section 8, sections 3-8.

* cited by examiner

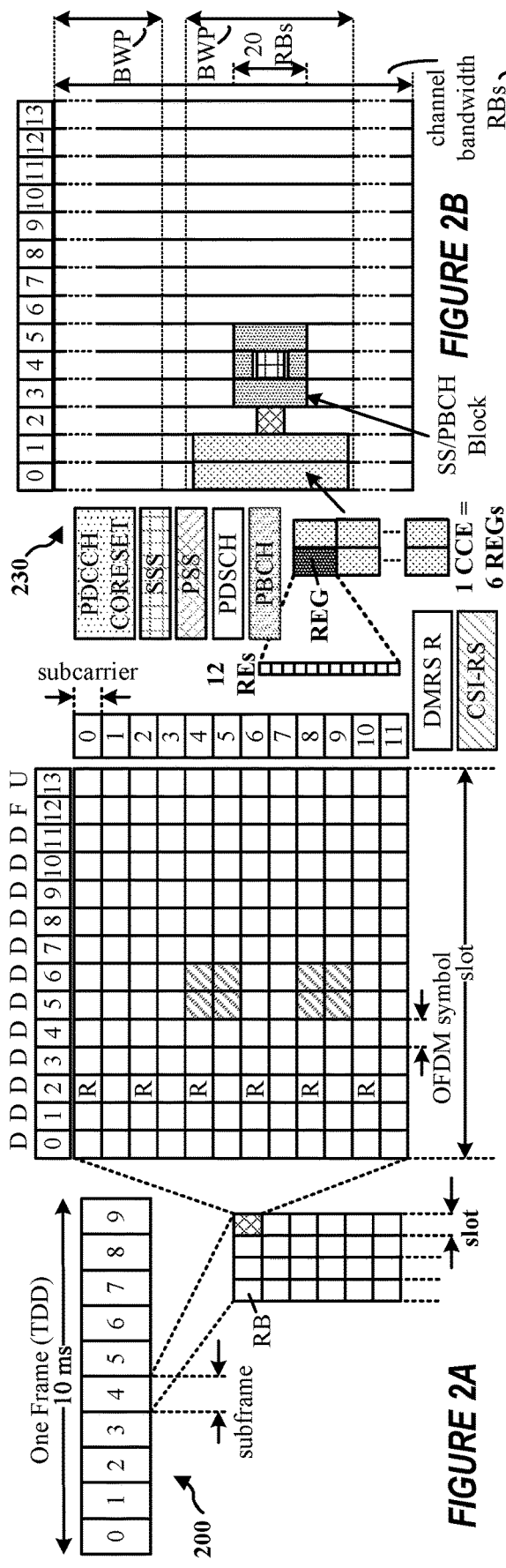
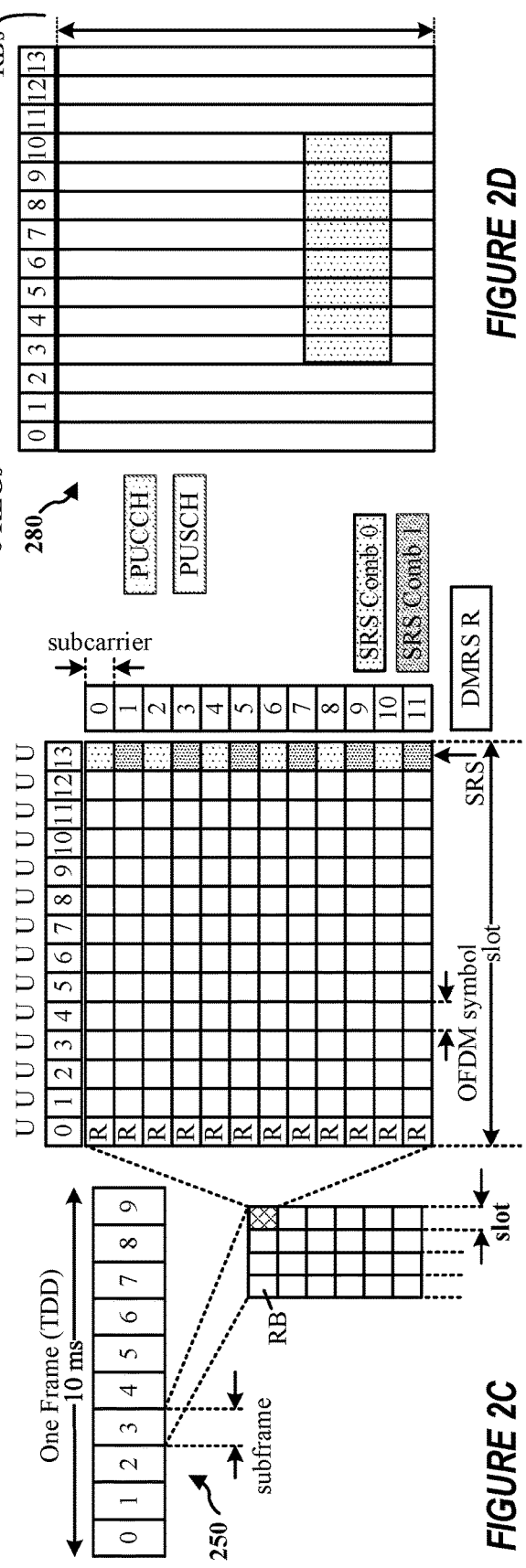
FIGURE 2A
FIGURE 2B
FIGURE 2C
FIGURE 2D

PHYSICAL UPLINK CONTROL CHANNEL (PUCCH) REPETITION FACTOR ASSOCIATED WITH A PUCCH RESOURCE INDICATOR (PRI)

CROSS-REFERENCE TO RELATED APPLICATIONS

This application claims the benefit of U.S. Provisional Patent Application No. 63/144,418, entitled, "PHYSICAL UPLINK CONTROL CHANNEL (PUCCH) REPETITION INDICATOR ASSOCIATED WITH A REPETITION FACTOR FOR MULTIPLE PUCCH TYPES," filed on Feb. 1, 2021, and the benefit of U.S. Provisional Patent Application No. 63/144,609, entitled, "SEMI-PERSISTENT INDICATION OF PUCCH REPETITION FACTOR VIA PRI," filed Feb. 2, 2021, both of which are expressly incorporated by reference herein in their entirety.

TECHNICAL FIELD

Aspects of the present disclosure relate generally to wireless communication systems, and more particularly, but without limitation, to a configuration to dynamically indicate a PUCCH repetition factor that is applicable to multiple PUCCHs, or to a physical uplink control channel (PUCCH) resource indicator (PRI) including a repetition indicator for a repetition factor, such as enhanced version of a PUCCH resource indicator associated with a PUCCH repetition factor.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the third ($3^{rd}$) Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. Accordingly, the systems, methods and devices of this disclosure each have several innovative aspects, no single one of which is solely responsible for the desirable attributes disclosed herein.

One innovative aspect of the subject matter described in this disclosure can be implemented in an apparatus configured for wireless communication. The apparatus includes at least one processor or modem, and a memory coupled to the at least one processor. The at least one processor is configured to receive a first configuration for downlink configuration information (DCI) that schedules a first physical downlink shared channel (PDSCH) and includes a physical uplink control channel (PUCCH) resource indicator (PRI) indicating a repetition factor of a first PUCCH associated with the first PDSCH and at least one additional PUCCH. The at least one processor is further configured to receive a second configuration assigning a plurality of PUCCH resources into a plurality of different groups, each of the plurality of different groups associated with a different repetition factor, the plurality of different groups including at least a first group and a second group. The at least one processor is also configured to receive an indication of a selection of a first PUCCH resource from the first group or the second group. Selection of the first PUCCH resource switches the repetition factor of other PUCCH resources to the repetition factor associated with the group from which the first PUCCH resource is selected. The at least one processor is configured to modify transmission of the at least one additional PUCCH associated with the repetition factor of the first PUCCH, and transmit the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

In some implementations of the apparatus, the at least one additional PUCCH is associated with a periodic channel state information (CSI) or a semi-persistent scheduling (SPS) feedback.

In some implementations of the apparatus, the repetition factor configures the at least one additional PUCCH based on a format of the at least one additional PUCCH.

Another innovative aspect of the subject matter described in this disclosure can be implemented in an apparatus configured for wireless communication. The apparatus includes an antenna array configured for wireless communication and a processor coupled to the antenna array. The antenna array is configured to receive a first configuration for DCI that schedules a first PDSCH and includes a PRI indicating a repetition factor of a first PUCCH associated with the first PDSCH and at least one additional PUCCH, and receive a second configuration assigning a plurality of PUCCH resources into a plurality of different groups, each of the plurality of different groups associated with a different repetition factor, the plurality of different groups including at least a first group and a second group. The antenna array is further configured to receive an indication of a selection of a first PUCCH resource from the first group or the second group. Selection of the first PUCCH resource switches the repetition factor of other PUCCH resources to the repetition factor associated with the group from which the first PUCCH resource is selected. The processor is configured to modify transmission of the at least one additional PUCCH associated with the repetition factor of the first PUCCH. The antenna array is further configured to transmit the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

Another innovative aspect of the subject matter described in this disclosure can be implemented in a method of wireless communication. The method includes receiving a first configuration for DCI that schedules a first PDSCH and includes a PRI indicating a repetition factor of a first PUCCH associated with the first PDSCH and at least one additional PUCCH. The method further includes receiving a second configuration assigning a plurality of PUCCH resources into a plurality of different groups, each of the plurality of different groups associated with a different repetition factor, the plurality of different groups including at least a first group and a second group. The method also includes receiving an indication of a selection of a first PUCCH resource from the first group or the second group. Selection of the first PUCCH resource switches the repetition factor of other PUCCH resources to the repetition factor associated with the group from which the first PUCCH resource is selected. The method includes modifying transmission of the at least one additional PUCCH associated with the repetition factor of the first PUCCH, and transmitting the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

Another innovative aspect of the subject matter described in this disclosure can be implemented in a non-transitory computer-readable medium storing instructions that, when executed by a processor, cause the processor to perform operations including receiving a first configuration for DCI that schedules a first PDSCH and includes a PRI indicating a repetition factor of a first PUCCH associated with the first PDSCH and at least one additional PUCCH. The operations also include receiving a second configuration assigning a plurality of PUCCH resources into a plurality of different groups, each of the plurality of different groups associated with a different repetition factor, the plurality of different groups including at least a first group and a second group. The operations further include receiving an indication of a selection of a first PUCCH resource from the first group or the second group. Selection of the first PUCCH resource switches the repetition factor of other PUCCH resources to the repetition factor associated with the group from which the first PUCCH resource is selected. The operations include modifying transmission of the at least one additional PUCCH associated with the repetition factor of the first PUCCH, and transmitting the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

Another innovative aspect of the subject matter described in this disclosure can be implemented in an apparatus configured for wireless communication. The apparatus includes means for receiving a first configuration for DCI that schedules a first PDSCH and includes a PRI indicating a repetition factor of a first PUCCH associated with the first PDSCH and at least one additional PUCCH. The apparatus further includes means for receiving a second configuration assigning a plurality of PUCCH resources into a plurality of different groups, each of the plurality of different groups associated with a different repetition factor, the plurality of different groups including at least a first group and a second group. The apparatus also includes receiving an indication of a selection of a first PUCCH resource from the first group or the second group. Selection of the first PUCCH resource switches the repetition factor of other PUCCH resources to the repetition factor associated with the group from which the first PUCCH resource is selected. The apparatus includes means for modifying transmission of the at least one additional PUCCH associated with the repetition factor of the first PUCCH, and means for transmitting the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

Another innovative aspect of the subject matter described in this disclosure can be implemented in an apparatus configured for wireless communication. The apparatus includes at least one processor or modem, and a memory coupled to the at least one processor. The at least one processor is configured to configure DCI that schedules a first PDSCH and includes a PRI indicating a repetition factor of a first PUCCH associated with the first PDSCH and at least one additional PUCCH, and transmit the DCI having the PRI to at least one user UE. The at least one processor is configured to assign PUCCH resources into a plurality of different groups. Each of the plurality of different groups is associated with a different repetition factor, and the plurality of different groups includes at least a first group and a second group. The at least one processor is also configured to select a first PUCCH resource from the first group or the second group. Selection of the first PUCCH resource switches the repetition factor of other PUCCH resources to the repetition factor associated with the group from which the first PUCCH resource is selected. The at least one processor is further configured to monitor for the at least one additional PUCCH, from the at least one UE. The at least one additional PUCCH is transmitted with a repetition factor based on a preconfiguration of PUCCH resource sets and selection of the first PUCCH resource.

Another innovative aspect of the subject matter described in this disclosure can be implemented in a method of wireless communication. The method includes configuring DCI that schedules a first PDSCH and includes a PRI indicating a repetition factor of a first PUCCH associated with the first PDSCH and at least one additional PUCCH, and transmitting the DCI having the PRI to at least one user UE. The method also includes assigning PUCCH resources into a plurality of different groups. Each of the plurality of different groups is associated with a different repetition factor, and the plurality of different groups includes at least a first group and a second group. The method further includes selecting a first PUCCH resource from the first group or the second group. Selection of the first PUCCH resource switches the repetition factor of other PUCCH resources to the repetition factor associated with the group from which the first PUCCH resource is selected. The method includes monitoring for the at least one additional PUCCH, from the at least one UE. The at least one additional PUCCH is transmitted with a repetition factor based on a preconfiguration of PUCCH resource sets and selection of the first PUCCH resource.

Another innovative aspect of the subject matter described in this disclosure can be implemented in a non-transitory computer-readable medium storing instructions that, when executed by a processor, cause the processor to perform operations including includes configuring DCI that schedules a first PDSCH and includes a PRI indicating a repetition factor of a first PUCCH associated with the first PDSCH and at least one additional PUCCH, and transmitting the DCI having the PRI to at least one user UE. The operations also include assigning PUCCH resources into a plurality of different groups. Each of the plurality of different groups is associated with a different repetition factor, and the plurality of different groups includes at least a first group and a second group. The operations further include selecting a first PUCCH resource from the first group or the second group. Selection of the first PUCCH resource switches the repetition factor of other PUCCH resources to the repetition factor associated with the group from which the first PUCCH resource is selected. The operations include monitoring for the at least one additional PUCCH, from the at least one UE. The at least one additional PUCCH is transmitted with a repetition factor based on a preconfiguration of PUCCH resource sets and selection of the first PUCCH resource.

Another innovative aspect of the subject matter described in this disclosure can be implemented in an apparatus configured for wireless communication. The apparatus includes means for configuring DCI that schedules a first PDSCH and includes a PRI indicating a repetition factor of a first PUCCH associated with the first PDSCH and at least one additional PUCCH, and means for transmitting the DCI having the PRI to at least one user UE. The apparatus also includes means for assigning PUCCH resources into a plurality of different groups. Each of the plurality of different groups is associated with a different repetition factor, and the plurality of different groups includes at least a first group and a second group. The apparatus further includes means for selecting a first PUCCH resource from the first group or the second group. Selection of the first PUCCH resource switches the repetition factor of other PUCCH resources to the repetition factor associated with the group from which the first PUCCH resource is selected. The apparatus includes means for monitoring for the at least one additional PUCCH, from the at least one UE. The at least one additional PUCCH is transmitted with a repetition factor based on a preconfiguration of PUCCH resource sets and selection of the first PUCCH resource.

Another innovative aspect of the subject matter described in this disclosure can be implemented in a method of wireless communication. The method includes receiving DCI including a PRI that includes a repetition indicator associated with a repetition factor. The repetition indicator is associated with multiple PUCCH types. The method further includes transmitting, associated with the repetition factor, a message associated with one of the multiple PUCCH types.

Another innovative aspect of the subject matter described in this disclosure can be implemented in an apparatus configured for wireless communication. The apparatus includes means for receiving DCI including a PRI that includes a repetition indicator associated with a repetition factor. The repetition indicator is associated with multiple PUCCH types. The apparatus further includes means for transmitting, associated with the repetition factor, a message associated with one of the multiple PUCCH types.

Another innovative aspect of the subject matter described in this disclosure can be implemented in a non-transitory computer-readable medium storing instructions that, when executed by a processor, cause the processor to perform operations including receiving DCI including a PRI that includes a repetition indicator associated with a repetition factor. The repetition indicator is associated with multiple PUCCH types. The operations further include initiating transmission, associated with the repetition factor, of a message associated with one of the multiple PUCCH types.

Another innovative aspect of the subject matter described in this disclosure can be implemented in an apparatus configured for wireless communication. The apparatus includes a processor and an antenna array coupled to the processor and configured for wireless communication. The antenna array is configured to receive DCI including a PRI that includes a repetition indicator associated with a repetition factor. The repetition indicator is associated with multiple PUCCH types. The antenna array is further configured to initiate transmission, associated with the repetition factor, of a message associated with one of the multiple PUCCH types.

In some implementations of the apparatus, the processor is configured to generate the message.

Another innovative aspect of the subject matter described in this disclosure can be implemented in an apparatus configured for wireless communication. The apparatus includes at least one processor and a memory coupled to the at least one processor. The at least one processor is configured to receive DCI including a PRI that includes a repetition indicator associated with a repetition factor. The repetition indicator is associated with multiple PUCCH types. The at least one processor is further configured to initiate transmission, associated with the repetition factor, of a message associated with one of the multiple PUCCH types.

Another innovative aspect of the subject matter described in this disclosure can be implemented in a user equipment (UE). The UE includes at least one processor and a memory coupled with the at least one processor and storing processor-readable instructions. The at least one processor configured to executed the process-readable instructions to receive DCI including a PRI that includes a repetition indicator associated with a repetition factor. The repetition indicator is associated with multiple PUCCH types. The at least one processor further configured to executed the process-readable instructions to initiate transmission, associated with the repetition factor, of a message associated with one of the multiple PUCCH types.

In an additional aspect of the disclosure, an apparatus configured for wireless communication is disclosed. The apparatus includes an interface, such as an antenna array, configured for wireless communication and a processor system, such as one or more processors, coupled to the interface. The processor system is configured to receive DCI including a PRI that includes a repetition indicator associated with a repetition factor. The repetition indicator is associated with multiple PUCCH types. The interface is configured to transmit, associated with the repetition factor, of a message associated with one of the multiple PUCCH types.

Another innovative aspect of the subject matter described in this disclosure can be implemented in a method of wireless communication. The method includes generating DCI including a PRI that includes a repetition indicator associated with a repetition factor. The repetition indicator is associated with multiple PUCCH types. The method also includes transmitting the DCI.

Another innovative aspect of the subject matter described in this disclosure can be implemented in an apparatus configured for wireless communication. The apparatus includes at least one processor and a memory coupled to the at least one processor. The at least one processor is configured to generate DCI including a PRI that includes a repetition indicator associated with a repetition factor. The repetition indicator is associated with multiple PUCCH types. The at least one processor is also configured to initiate transmission of the DCI.

Another innovative aspect of the subject matter described in this disclosure can be implemented in an apparatus configured for wireless communication. The apparatus includes means for generating DCI including a PRI that includes a repetition indicator associated with a repetition factor. The repetition indicator is associated with multiple PUCCH types. The apparatus further includes means for transmitting the DCI.

Another innovative aspect of the subject matter described in this disclosure can be implemented in a non-transitory computer-readable medium storing instructions that, when executed by a processor, cause the processor to perform operations including generating DCI including a PRI that includes a repetition indicator associated with a repetition factor. The repetition indicator is associated with multiple PUCCH types. The operations further include initiating transmission of the DCI.

Another innovative aspect of the subject matter described in this disclosure can be implemented in a base station. The base station includes at least one processor and a memory coupled with the at least one processor and storing processor-readable instructions. The at least one processor configured to executed the process-readable instructions to generate DCI including a PRI that includes a repetition indicator associated with a repetition factor. The repetition indicator is associated with multiple PUCCH types. The at least one processor further configured to executed the process-readable instructions to initiate transmission of the DCI.

In an additional aspect of the disclosure, an apparatus configured for wireless communication is disclosed. The apparatus includes an interface, such as an antenna array, configured for wireless communication and a processor system, such as one or more processors, coupled to the interface. The processor system is configured to generate DCI including a PRI that includes a repetition indicator associated with a repetition factor. The repetition indicator is associated with multiple PUCCH types. The interface is configured to transmit the DCI.

Details of one or more implementations of the subject matter described in this disclosure are set forth in the accompanying drawings and the description below. Other features, aspects, and advantages will become apparent from the description, the drawings, the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of UL channels within a subframe.

Like reference numbers and designations in the various drawings indicate like elements.

DETAILED DESCRIPTION

Figure 1:
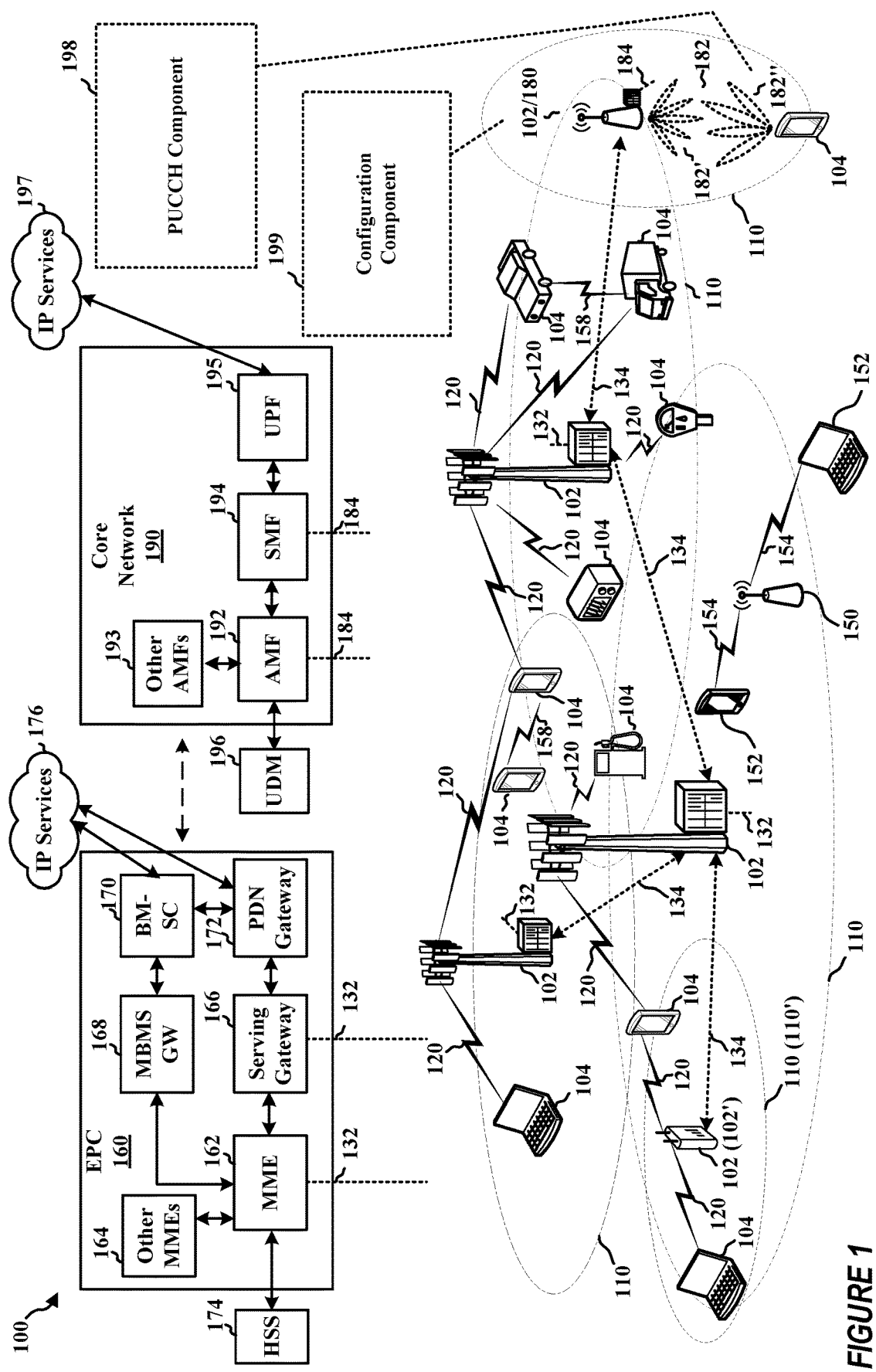
FIG. 1 is a diagram illustrating an example of a wireless communications system and an access network.

Some of the examples in this disclosure are based on wireless and wired local area network (LAN) communication according to the Institute of Electrical and Electronics Engineers (IEEE) 802.11 wireless standards, the IEEE 802.3

Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UNITS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km$^2$), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps/km$^2$), extreme data rates (such as multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

In some wireless communication systems, PUCCH may be configured to allow for signaling mechanisms to support an indication of a dynamic PUCCH repetition factor. In some instances, the PUCCH may be configured to allow for a mechanism to support DMRS bundling across PUCCH repetitions. In addition, the dynamic indication of a PUCCH repetition factor may be achieved by configured repetition per PUCCH resource set and dynamic indication of PRI via DCI that schedules PDSCH. However, this approach is only applicable for a PUCCH that carries an acknowledgement (ACK)/not-acknowledgement (NACK) for a scheduled PDSCH, because the PRI is addressing resource sets for the PUCCH associated with the scheduled PDSCH. As such, the dynamic indication of the repetition factor may not be applicable for ACK/NACK feedback for SPS, periodic CSI on PUCCH, or SR. For example, SPS does not have a PDCCH that schedules each instance of SPS because the resources are configured. In addition, periodic CSI does not have a DCI indicating PUCCH resources every time a periodic CSI is to be transmitted.

Aspects provided herein provide a configuration to dynamically indicate a PUCCH repetition factor that is applicable to multiple PUCCHs. For example, a base station may configure a DCI that schedules a first PDSCH and includes a PRI that indicates a repetition factor of a first PUCCH that is associated with the first PDSCH and at least one additional PUCCH. The at least one additional PUCCH may not be associated with the first PDSCH scheduled by the DCI. The PUCCH may be associated with another resource set, such as but not limited to periodic CSI, SPS feedback, or any other PDSCH that is not scheduled by the DCI.

Particular implementations of the subject matter described herein can be implemented to realize one or more of the following potential advantages. In some aspects, the present disclosure provides a process and techniques for supporting a PRI. In some aspects, a PUCCH repetition factor is dynamically indicated that is applicable to multiple PUCCHs. Accordingly, at least one advantage of the disclosure is that the PRI may dynamically indicate a repetition factor that may be applied to other PUCCHs other than the PUCCH associated with the PDSCH scheduled by the DCI. By applying the repetition fact to other PUCCHs other than the PUCCH associated with the PDSCH scheduled by the DCI, overhead signaling may be reduce to thereby improve system efficiency.

The present disclosure provides systems, apparatus, methods, and computer-readable media for that supports PRI for a repetition indicator of a repetition factor. For example, the base station may generate DCI including a PRI that includes the repetition indicator of a repetition factor. The repetition indicator is associated with multiple PUCCH types. The multiple PUCCH types include ACK/NACK for a scheduled PDSCH, ACK/NACK of SPS, periodic CSI on PUCCH, SR, or a combination thereof. The base station transmits the DCI which may be received the UE. Based on the repetition factor, the UE may transmit a message associated with one of the multiple PUCCH types. For example, the UE may transmit the message multiple times based on the repetition factor.

Particular implementations of the subject matter described herein can be implemented to realize one or more of the following potential advantages. In some aspects, the present disclosure provides a process and techniques for supporting a PRI, such as enhanced PRI associated with a PUCCH repetition factor, for multiple PUCCH types. The PRI may be included in DCI and enable dynamic PUCCH repetition factor indication. As compared to a conventional PRI which may dynamically indicate a PUCCH repetition factor that applies for the PUCCH that carries ACK/NACK for the scheduled PDSCH, the PRI described herein may reduce overhead and signaling to set or update a repetition factor by being applicable to PUCCH other than or in addition to the PUCCH that carries ACK/NACK for the scheduled PDSCH. For example, the PRI may be applicable to ACK/NACK of SPS, periodic CSI on PUCCH, an SR, or a combination thereof.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (such as 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (such as macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit at least one additional PUCCH based on a dynamic indication of a PUCCH repetition factor that is applicable to multiple PUCCHs. For example, the UE 104 may include a PUCCH component 198 configured to transmit at least one additional PUCCH based on a dynamic indication of a PUCCH repetition factor that is applicable to multiple PUCCHs. The UE 104 receives a configuration for DCI that schedules a first PDSCH and includes a PRI indicating a repetition factor of a first PUCCH associated with the first PDSCH and at least one additional PUCCH. The UE 104 modifies transmission of the at least one additional PUCCH associated with the repetition factor of the first PUCCH. The UE 104 transmits the at least one additional PUCCH, to a base station 180, wherein the at least one additional PUCCH is transmitted with the repetition factor based on a preconfiguration of PUCCH resource sets and a selection of a PUCCH resource set by the PRI.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (p). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (such as 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (such as common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
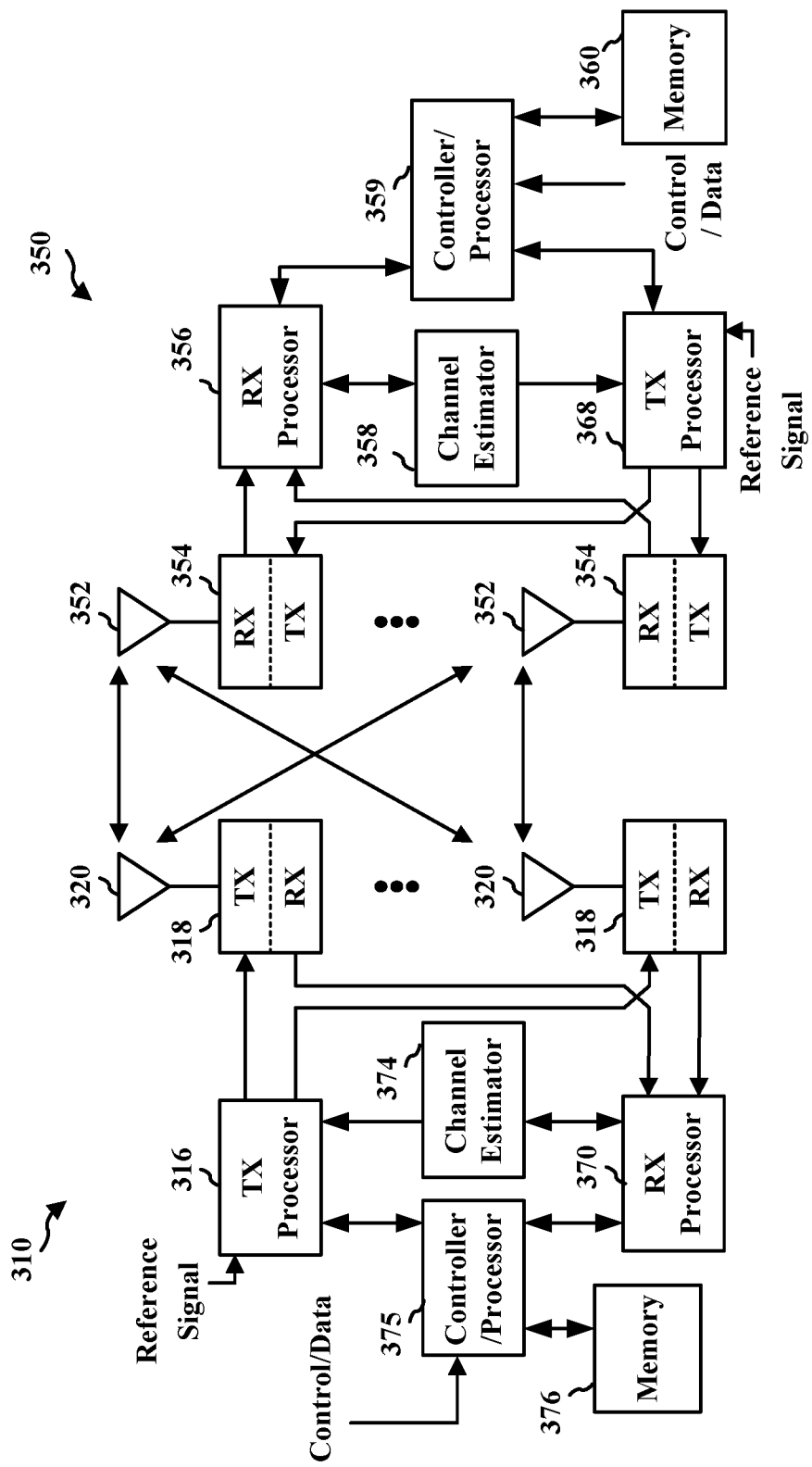
FIG. 3 is a diagram illustrating an example of a base station (BS) and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with configuration component 199 of FIG. 1.

Figure 4:
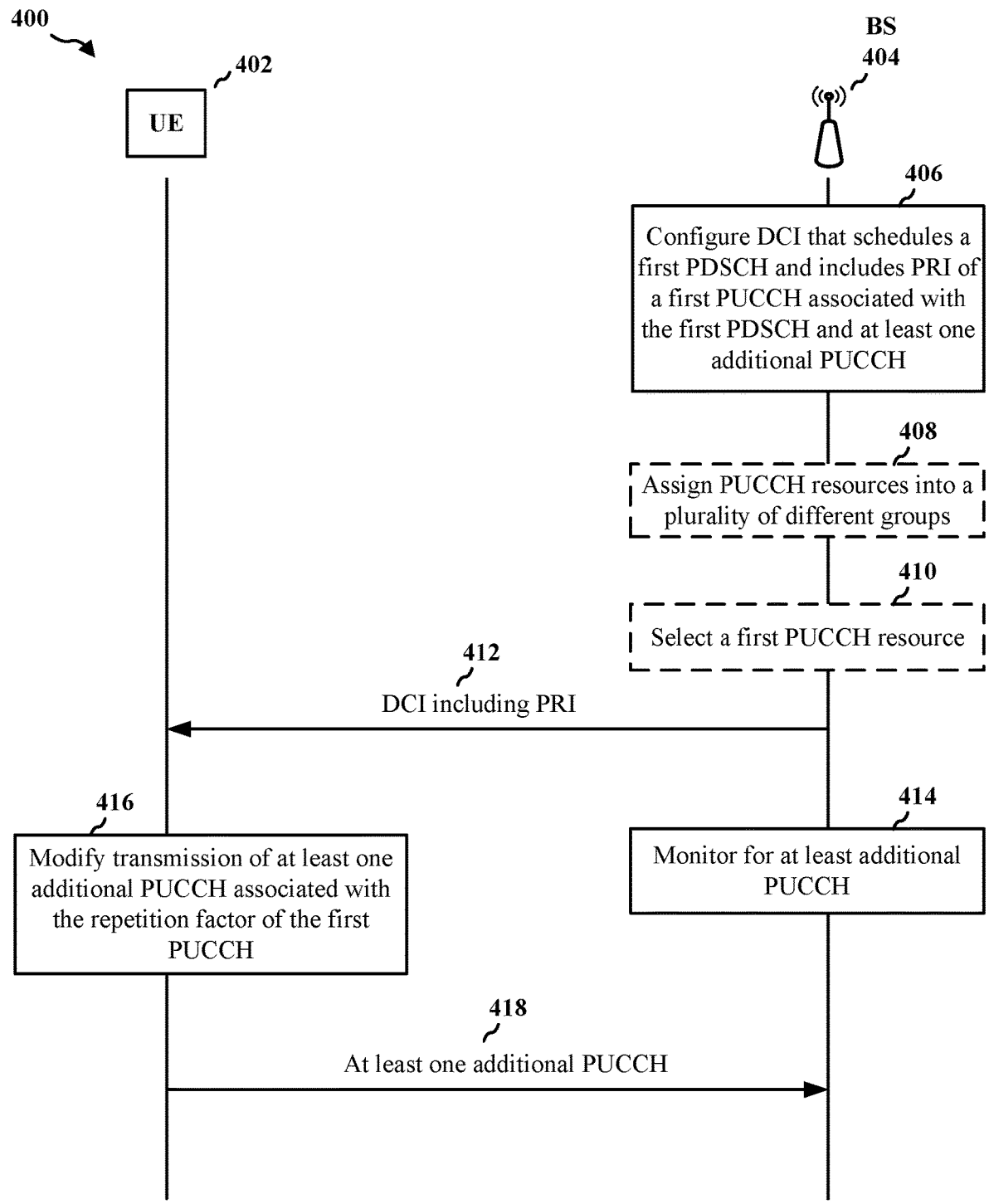
FIG. 4 is a call flow diagram of signaling between a UE and a BS in accordance with certain aspects of the disclosure.

FIG. 4 is a call flow diagram 400 of signaling between a UE 402 and a base station 404. The base station 404 may be configured to provide at least one cell. The UE 402 may be configured to communicate with the base station 404. For example, in the context of FIG. 1, the base station 404 may correspond to base station 102/180 and, accordingly, the cell may include a geographic coverage area 110 in which communication coverage is provided and/or small cell 102' having a coverage area 110'. Further, a UE 402 may correspond to at least UE 104. In another example, in the context of FIG. 3, the base station 404 may correspond to base station 310 and the UE 402 may correspond to UE 350. Optional aspects are illustrated with a dashed line.

As illustrated at 406, the base station 404 may configure a DCI that schedules a first PDSCH and includes a PRI indicating a repetition factor of a first PUCCH associated with the first PDSCH and at least one additional PUCCH. The repetition factor indicated in the PRI also may be applied for another PUCCH associated with another resource or another resource set. In some aspects, the PRI may implicitly indicate the repetition factor, where the implicit indication may be based on a configuration of the indicated PUCCH resource set. In some aspects, the at least one additional PUCCH may be associated with a periodic channel state information (CSI) or a semi-persistent scheduling (SPS) feedback. In some aspects, the at least one additional PUCCH may be associated with at least one additional PDSCH other than the first PDSCH scheduled by the DCI. The at least one additional PUCCH is not associated with the first PDSCH that is scheduled by the DCI. In some aspects, the repetition factor may configure the at least one additional PUCCH based on a configuration of the first PUCCH. The repetition factor of the at least one additional PUCCH may be a factor of the repetition factor of the first PUCCH. For example, the repetition factor of the at least one additional PUCCH may repeat at 1×, 2×, 3×, or etc. the repetition factor of the first PUCCH. In some aspects, the repetition factor may configure the at least one additional PUCCH based on a format of the at least one additional PUCCH. Different PUCCH formats of the at least one additional PUCCH may have different repetition factors. For example, the at least one additional PUCCH having a first PUCCH format may have a first repetition factor, the at least one additional PUCCH having a second PUCCH format may have a second repetition factor, and etc. The respective repetition factors may continue to be applied while the PRI is valid or overwritten by a new PRI. In some aspects, the repetition factor may configure the at least one additional PUCCH based on a size of an uplink control information (UCI) or based on a content of the UCI. For example, in instances where the content of the UCI includes periodic CSI, the repetition factor of the at least one additional PUCCH may be twice the repetition factor of the first PUCCH.

In some aspects, for example as illustrated at 408, the base station 404 may assign PUCCH resources, or a PUCCH resource set, into a plurality of different groups. Each of the plurality of different groups may be associated with a different repetition factor. The plurality of different groups may include at least a first group and a second group. The configuration assigning the PUCCH resources, or the PUCCH resource sets, into the plurality of different groups may be within the DCI.

In some aspects, for example as illustrated at 410, the base station 404 may select a first PUCCH resource, or a first PUCCH resource set, from the first group of the second group. Selection of the first PUCCH resource, or the first PUCCH resource set, may switch the repetition factor of other PUCCH resources or other PUCCH resource sets to the repetition factor associated with the group from which the first PUCCH resource set is selected. For example, in instances where the first PUCCH resource set is selected from the first group, the selection may switch the repetition factor of other PUCCH resource sets to the repetition factor of the first group. In some aspects, the first PUCCH resource, or the first PUCCH resource set, may be selected from the first group having a first repetition factor, such that the repetition factor of the other PUCCH resources or the other PUCCH resource sets is switched to the first repetition factor. In some aspects, the repetition factor may be valid until overwritten by another PRI. In some aspects, the repetition factor may be valid for a time duration. The time duration may be determined based on the selected resource set. The selection of the first PUCCH resource set may be included within the DCI.

As illustrated at 412, the base station 404 may transmit the DCI having the PRI. The base station may transmit the DCI having the PRI to a UE 402. The UE 402 may receive the configuration for the DCI that schedules the first PDSCH and includes the PRI from the base station 404.

In some aspects, the UE 402 may receive the configuration assigning the PUCCH resources or the PUCCH resource sets into the plurality of different groups. The configuration assigning the PUCCH resources or the PUCCH resource sets into the plurality of different groups may be within the DCI. In some aspects, the UE 402 may receive the indication of the selection of the first PUCCH resource or the first PUCCH resource set from the first group or the second group. Selection of the first PUCCH resource or the first PUCCH resource set may switch the repetition factor of other PUCCH resource set to the repetition factor associated with the group from which the first PUCCH resource or the first PUCCH resource set is selected. For example, in instances where the first PUCCH resource set is selected from the first group, the selection may switch the repetition factor of other PUCCH resource sets to the repetition factor of the first group. In some aspects, the first PUCCH resource or the first PUCCH resource set may be selected from the first group having a first repetition factor, such that the repetition factor of the other PUCCH resources or the other PUCCH resource sets is switched to the first repetition factor. In some aspects, the repetition factor may be valid until overwritten by another PRI. In some aspects, the repetition factor may be valid for a time duration. The time duration may be determined based on the selected resource set. The indication of the selection of the first PUCCH resource set may be included within the DCI.

As illustrated at 414, the base station 404 may monitor for the at least one additional PUCCH from the at least one UE. The at least one additional PUCCH may be transmitted with a repetition factor based on a preconfiguration of PUCCH resource sets and a selection of a PUCCH resource or a PUCCH resource set by the PRI.

As illustrated at 416, the UE 402 may modify transmission of the at least one additional PUCCH. The UE may modify the transmission of the at least one additional PUCCH associated with the repetition factor of the first PUCCH.

As illustrated at 418, the UE 402 may transmit the at least one additional PUCCH to a base station. The base station may receive the at least one additional PUCCH from the UE. The at least one additional PUCCH may be transmitted, by the UE, with a repetition factor based on a preconfiguration of PUCCH resource sets and a selection of a PUCCH resource or a PUCCH resource set by the PRI.

Figure 5:
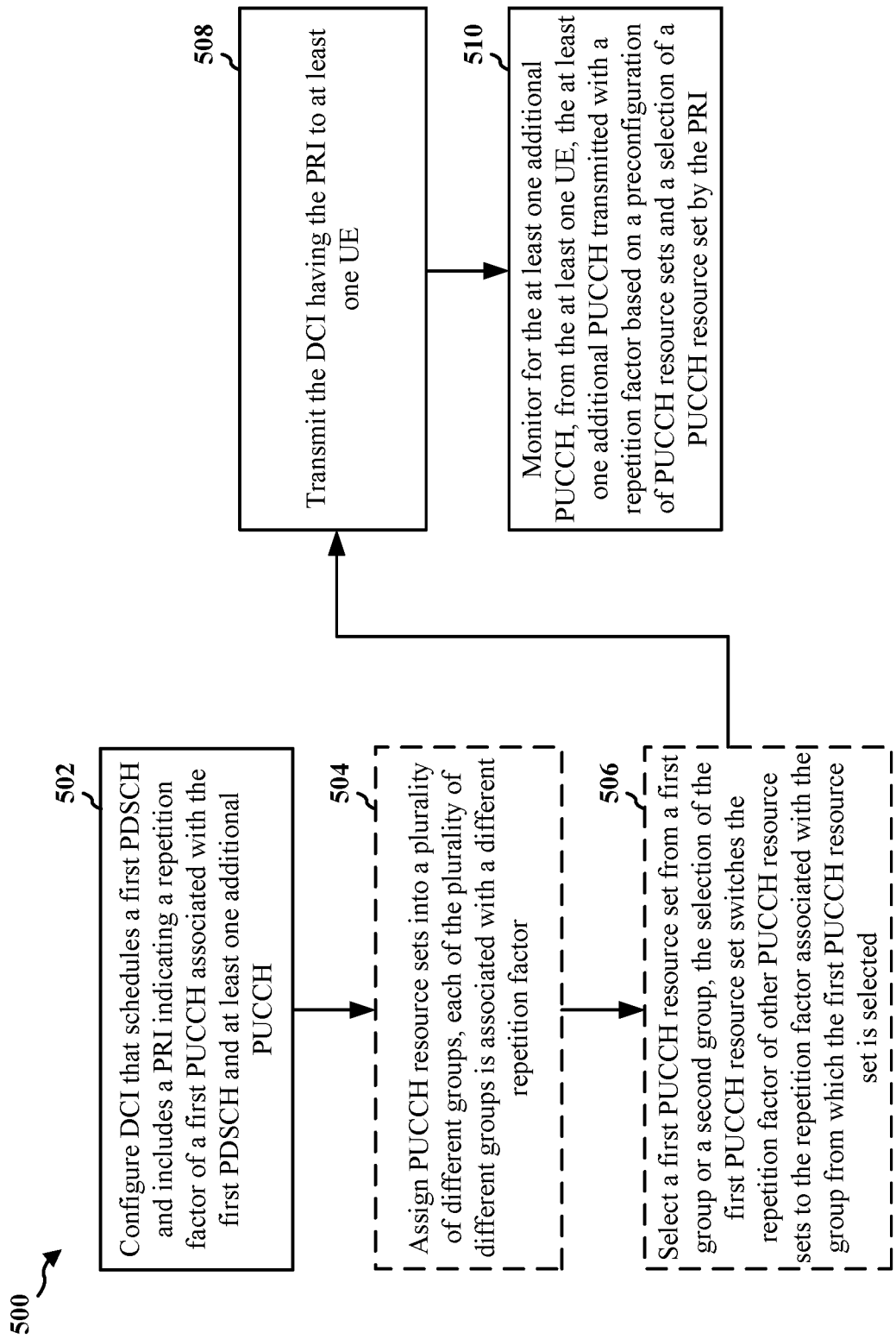
FIG. 5 is a flowchart of a method of wireless communication.

FIG. 5 is a flowchart 500 of a method of wireless communication. The method may be performed by a base station or a component of a base station (such as the base station 102/180, 404; the apparatus 602; the baseband unit 604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to provide a dynamic indication of a PUCCH repetition factor that is applicable to multiple PUCCHs.

At 502, the base station may configure a DCI that schedules a first PDSCH and includes a PRI indicating a repetition factor of a first PUCCH associated with the first PDSCH and at least one additional PUCCH. For example, 502 may be performed by configuration component 640 of apparatus 602. In some aspects, the at least one additional PUCCH may be associated with a periodic CSI or an SPS feedback. In some aspects, the at least one additional PUCCH may be associated with at least one additional PDSCH other than the first PDSCH scheduled by the DCI. The at least one additional PUCCH is not associated with the first PDSCH that is scheduled by the DCI. In some aspects, the repetition factor may configure the at least one additional PUCCH based on a configuration of the first PUCCH. The repetition factor of the at least one additional PUCCH may be a factor of the repetition factor of the first PUCCH. For example, the repetition factor of the at least one additional PUCCH may repeat at 1×, 2×, 3×, or etc. the repetition factor of the first PUCCH. In some aspects, the repetition factor may configure the at least one additional PUCCH based on a format of the at least one additional PUCCH. Different PUCCH formats of the at least one additional PUCCH may have different repetition factors. For example, the at least one additional PUCCH having a first PUCCH format may have a first repetition factor, the at least one additional PUCCH having a second PUCCH format may have a second repetition factor, and etc. The respective repetition factors may continue to be applied while the PRI is valid or overwritten by a new PRI. In some aspects, the repetition factor may configure the at least one additional PUCCH based on a size of a UCI or based on a content of the UCI. For example, in instances where the content of the UCI includes periodic CSI, the repetition factor of the at least one additional PUCCH may be twice the repetition factor of the first PUCCH.

In some aspects, for example at 504, the base station may assign PUCCH resource set into a plurality of different groups. For example, 504 may be performed by assignment component 642 of apparatus 602. Each of the plurality of different groups may be associated with a different repetition factor. The plurality of different groups may include at least a first group and a second group. The configuration assigning the PUCCH resource sets into the plurality of different groups may be within the DCI.

In some aspects, for example at 506, the base station may select a first PUCCH resource set from the first group of the second group. For example, 506 may be performed by selection component 644 of apparatus 602. Selection of the first PUCCH resource set may switch the repetition factor of other PUCCH resource set to the repetition factor associated with the group from which the first PUCCH resource set is selected. For example, in instances where the first PUCCH resource set is selected from the first group, the selection may switch the repetition factor of other PUCCH resource sets to the repetition factor of the first group. In some aspects, the first PUCCH resource set may be selected from the first group having a first repetition factor, such that the repetition factor of the other PUCCH resource sets is switched to the first repetition factor. In some aspects, the repetition factor may be valid until overwritten by another PRI. In some aspects, the repetition factor may be valid for a time duration. The time duration may be determined based on the selected resource set. The selection of the first PUCCH resource set may be included within the DCI.

At 508, the base station may transmit the DCI having the PRI. For example, 508 may be performed by DCI component 646 of apparatus 602. The base station may transmit the DCI having the PRI to at least one UE.

At 510, the base station may monitor for the at least one additional PUCCH from the at least one UE. For example, 510 may be performed by monitor component 648 of apparatus 602. The at least one additional PUCCH may be transmitted with a repetition factor based on a preconfiguration of PUCCH resource sets and a selection of a PUCCH resource set by the PRI.

In some implementations, a method of wireless communication includes configuring DCI that schedules a first PDSCH and includes a PRI indicating a repetition factor of a first PUCCH associated with the first PDSCH and at least one additional PUCCH, and transmitting the DCI having the PRI to at least one user UE. The method also may include assigning PUCCH resources into a plurality of different groups. Each of the plurality of different groups is associated with a different repetition factor, and the plurality of different groups includes at least a first group and a second group. The method may further include selecting a first PUCCH resource from the first group or the second group. Selection of the first PUCCH resource switches the repetition factor of other PUCCH resources to the repetition factor associated with the group from which the first PUCCH resource is selected. The method may include monitoring for the at least one additional PUCCH, from the at least one UE. The at least one additional PUCCH is transmitted with a repetition factor based on a preconfiguration of PUCCH resource sets and selection of the first PUCCH resource.

Figure 6:
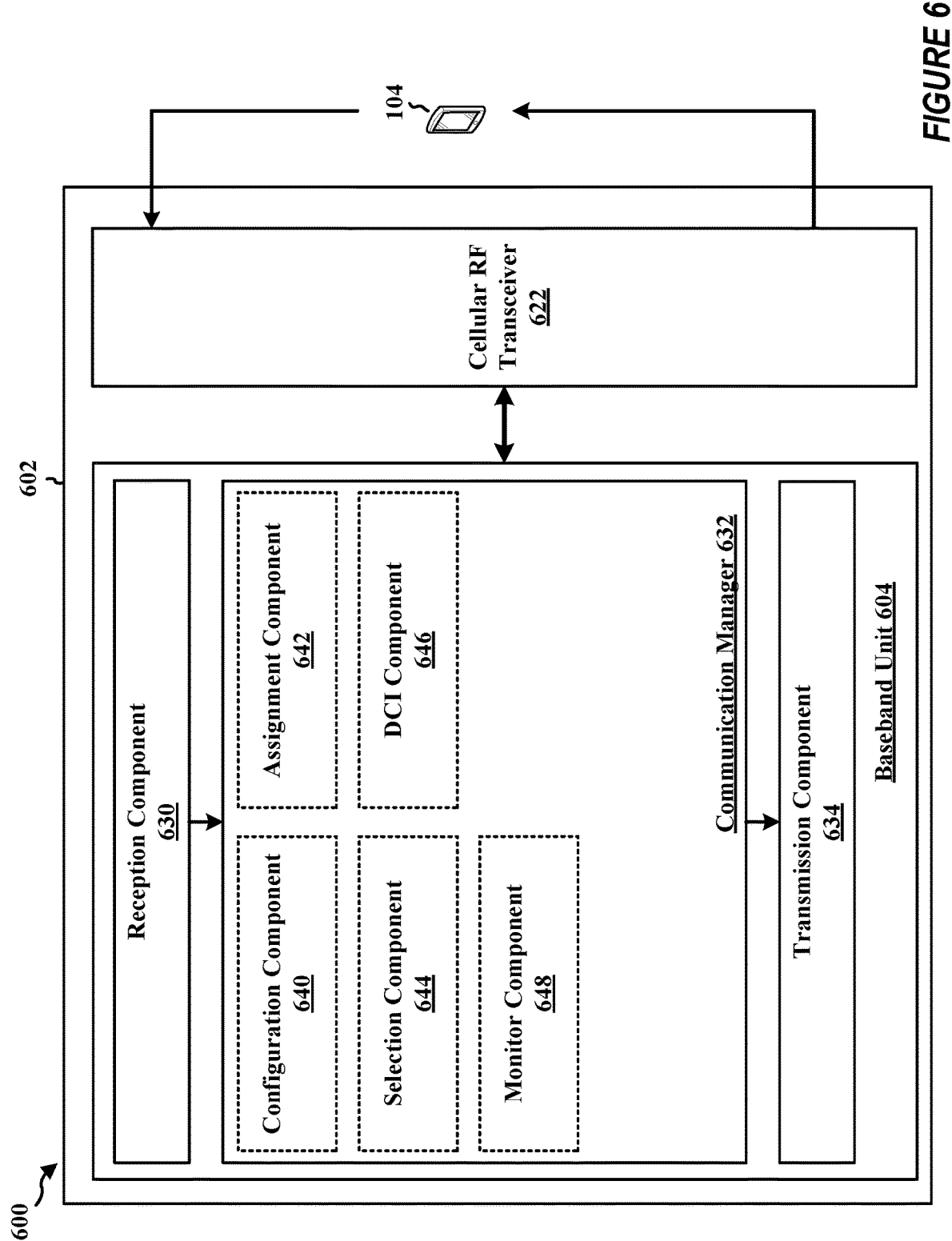
FIG. 6 is a diagram illustrating an example of a hardware implementation for an example apparatus.

FIG. 6 is a diagram 600 illustrating an example of a hardware implementation for an apparatus 602. The apparatus 602 is a BS and includes a baseband unit 604. The baseband unit 604 may communicate through a cellular RF transceiver 622 with the UE 104. The baseband unit 604 may include a computer-readable medium/memory. The baseband unit 604 is responsible for general processing, including the execution of software stored on the computer-readable medium/memory. The software, when executed by the baseband unit 604, causes the baseband unit 604 to perform the various functions described supra. The computer-readable medium/memory also may be used for storing data that is manipulated by the baseband unit 604 when executing software. The baseband unit 604 further includes a reception component 630, a communication manager 632, and a transmission component 634. The communication manager 632 includes the one or more illustrated components. The components within the communication manager 632 may be stored in the computer-readable medium/memory and/or configured as hardware within the baseband unit 604. The baseband unit 604 may be a component of the base station 310 and may include the memory 376 and/or at least one of the TX processor 316, the RX processor 370, and the controller/processor 375.

The communication manager 632 includes a configuration component 640 that may configure a DCI that schedules a first PDSCH and includes a PRI indicating a repetition factor of a first PUCCH associated with the first PDSCH and at least one additional PUCCH, such as described in connection with 502 of FIG. 5. The communication manager 632 further includes an assignment component 642 that may assign PUCCH resource set into a plurality of different groups, such as described in connection with 504 of FIG. 5. The communication manager 632 further includes a selection component 644 that may select a first PUCCH resource set from the first group of the second group, such as described in connection with 506 of FIG. 5. The communication manager 632 further includes a DCI component 646 that may transmit the DCI having the PRI, such as described in connection with 508 of FIG. 5. The communication manager 632 further includes a monitor component 648 that may monitor for the at least one additional PUCCH from the at least one UE, such as described in connection with 510 of FIG. 5.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the baseband unit 604, includes means for configuring DCI that schedules a first PDSCH and includes a PRI indicating a repetition factor of a first PUCCH associated with the first PDSCH and at least one additional PUCCH. The apparatus includes means for transmitting the DCI having the PRI to at least one UE. The apparatus includes means for monitoring for the at least one additional PUCCH from the at least one UE. The at least one additional PUCCH is transmitted with a repetition factor based on a preconfiguration of PUCCH resource sets and a selection of a PUCCH resource set by the PRI. The apparatus further includes means for assigning the PUCCH resource sets into a plurality of different groups. Each of the plurality of different groups is associated with a different repetition factor. The plurality of different groups including at least a first group and a second group. The apparatus further includes means for selecting a first PUCCH resource set from the first group or the second group. Selection of the first PUCCH resource set switches the repetition factor of other PUCCH resource sets to the repetition factor associated with the group from which the first PUCCH resource set is selected. The aforementioned means may be one or more of the aforementioned components of the apparatus 602 configured to perform the functions recited by the aforementioned means. As described supra, the apparatus 602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 7:
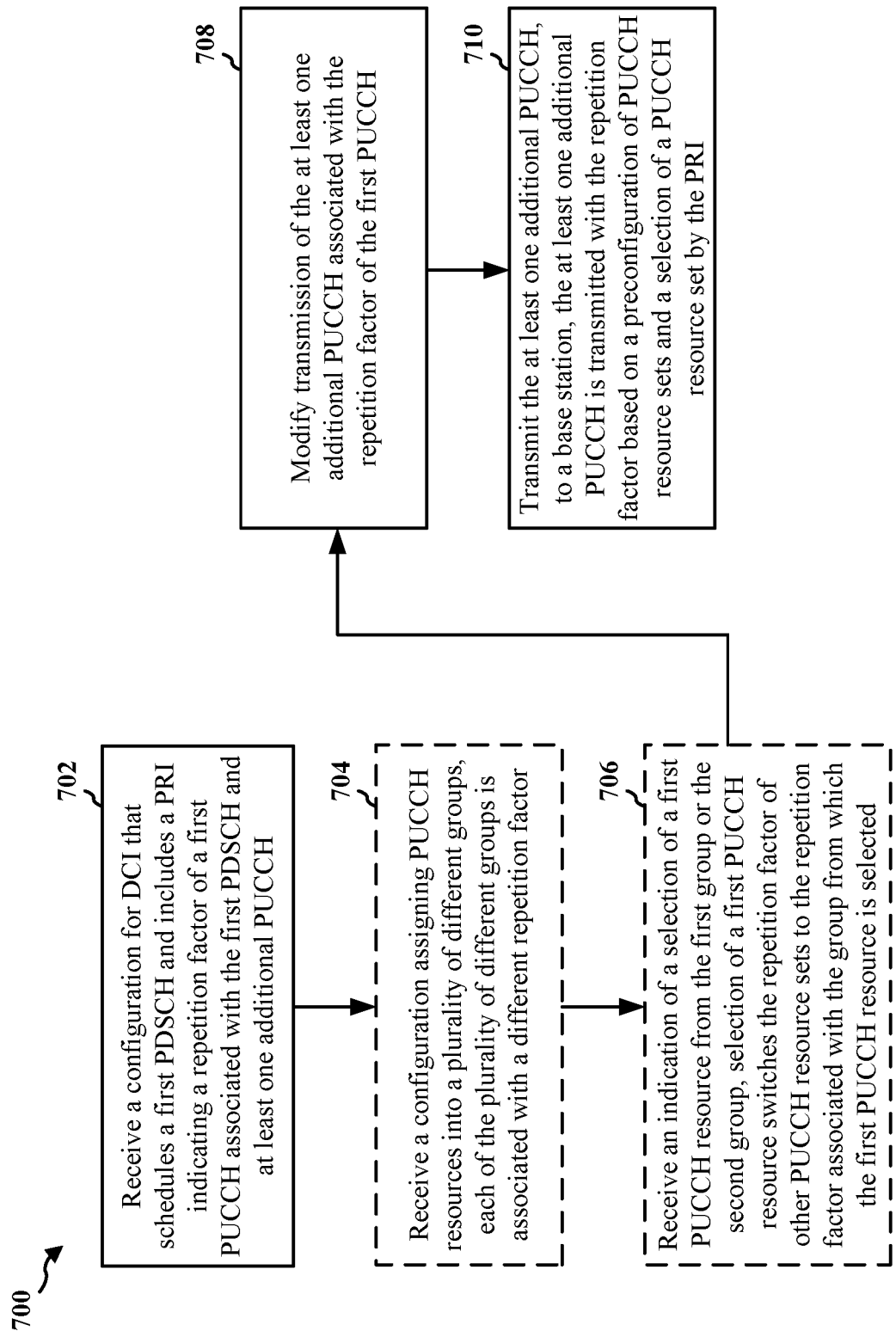
FIG. 7 is a flowchart of a method of wireless communication.

FIG. 7 is a flowchart 700 of a method of wireless communication. The method may be performed by a UE or a component of a UE (such as the UE 104, 402; the apparatus 802; the cellular baseband processor 804, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to transmit at least one additional PUCCH based on a dynamic indication of a PUCCH repetition factor that is applicable to multiple PUCCHs.

At 702, the UE may receive a configuration for a DCI that schedules a first PDSCH and includes a PRI indicating a repetition factor of a first PUCCH associated with the first PDSCH and at least one additional PUCCH. For example, 702 may be performed by configuration component 840 of apparatus 802. The UE may receive the configuration for the DCI that schedules the first PDSCH and includes the PRI from a base station. In some aspects, the at least one additional PUCCH may be associated with a periodic channel state information (CSI) or a semi-persistent scheduling (SPS) feedback. In some aspects, the at least one additional PUCCH may be associated with at least one additional PDSCH other than the first PDSCH scheduled by the DCI. The at least one additional PUCCH is not associated with the first PDSCH that is scheduled by the DCI. In some aspects, the repetition factor may configure the at least one additional PUCCH based on a configuration of the first PUCCH. The repetition factor of the at least one additional PUCCH may be a factor of the repetition factor of the first PUCCH. For example, the repetition factor of the at least one additional PUCCH may repeat at 1×, 2×, 3×, or etc. the repetition factor of the first PUCCH. In some aspects, the repetition factor may configure the at least one additional PUCCH based on a format of the at least one additional PUCCH. Different PUCCH formats of the at least one additional PUCCH may have different repetition factors. For example, the at least one additional PUCCH having a first PUCCH format may have a first repetition factor, the at least one additional PUCCH having a second PUCCH format may have a second repetition factor, and etc. The respective repetition factors may continue to be applied while the PRI is valid or overwritten by a new PRI. In some aspects, the repetition factor may configure the at least one additional PUCCH based on a size of an uplink control information (UCI) or based on a content of the UCI. For example, in instances where the content of the UCI includes periodic CSI, the repetition factor of the at least one additional PUCCH may be twice the repetition factor of the first PUCCH.

In some aspects, for example at 704, the UE may receive a configuration assigning the PUCCH resource sets into a plurality of different groups. For example, 704 may be performed by assignment component 842 of apparatus 802. Each of the plurality of different groups may be associated with a different repetition factor. The plurality of different groups may include at least a first group and a second group. The configuration assigning the PUCCH resource sets into the plurality of different groups may be within the DCI.

In some aspects, for example at 706, the UE may receive an indication of a selection of a first PUCCH resource set from the first group or the second group. For example, 706 may be performed by selection component 844 of apparatus 802. Selection of the first PUCCH resource set may switch the repetition factor of other PUCCH resource set to the repetition factor associated with the group from which the first PUCCH resource set is selected. For example, in instances where the first PUCCH resource set is selected from the first group, the selection may switch the repetition factor of other PUCCH resource sets to the repetition factor of the first group. In some aspects, the first PUCCH resource set may be selected from the first group having a first repetition factor, such that the repetition factor of the other PUCCH resource sets is switched to the first repetition factor. In some aspects, the repetition factor may be valid until overwritten by another PRI. In some aspects, the repetition factor may be valid for a time duration. The time duration may be determined based on the selected resource set. The indication of the selection of the first PUCCH resource set may be included within the DCI.

At 708, the UE may modify transmission of the at least one additional PUCCH. For example, 708 may be performed by modification component 846 of apparatus 802. The UE may modify the transmission of the at least one additional PUCCH associated with the repetition factor of the first PUCCH.

At 710, the UE may transmit the at least one additional PUCCH to a base station. For example, 710 may be performed by PUCCH component 848 of apparatus 802. The at least one additional PUCCH may be transmitted with a repetition factor based on a preconfiguration of PUCCH resource sets and a selection of a PUCCH resource set by the PRI.

In some implementations, the method of wireless communication may include receiving a first configuration for DCI that schedules a first PDSCH and includes a PRI indicating a repetition factor of a first PUCCH associated with the first PDSCH and at least one additional PUCCH. The method may further include receiving a second configuration assigning a plurality of PUCCH resources into a plurality of different groups, each of the plurality of different groups associated with a different repetition factor, the plurality of different groups including at least a first group and a second group. The method also may include receiving an indication of a selection of a first PUCCH resource from the first group or the second group. Selection of the first PUCCH resource switches the repetition factor of other PUCCH resources to the repetition factor associated with the group from which the first PUCCH resource is selected. The method may include modifying transmission of the at least one additional PUCCH associated with the repetition factor of the first PUCCH, and transmitting the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI.

Figure 8:
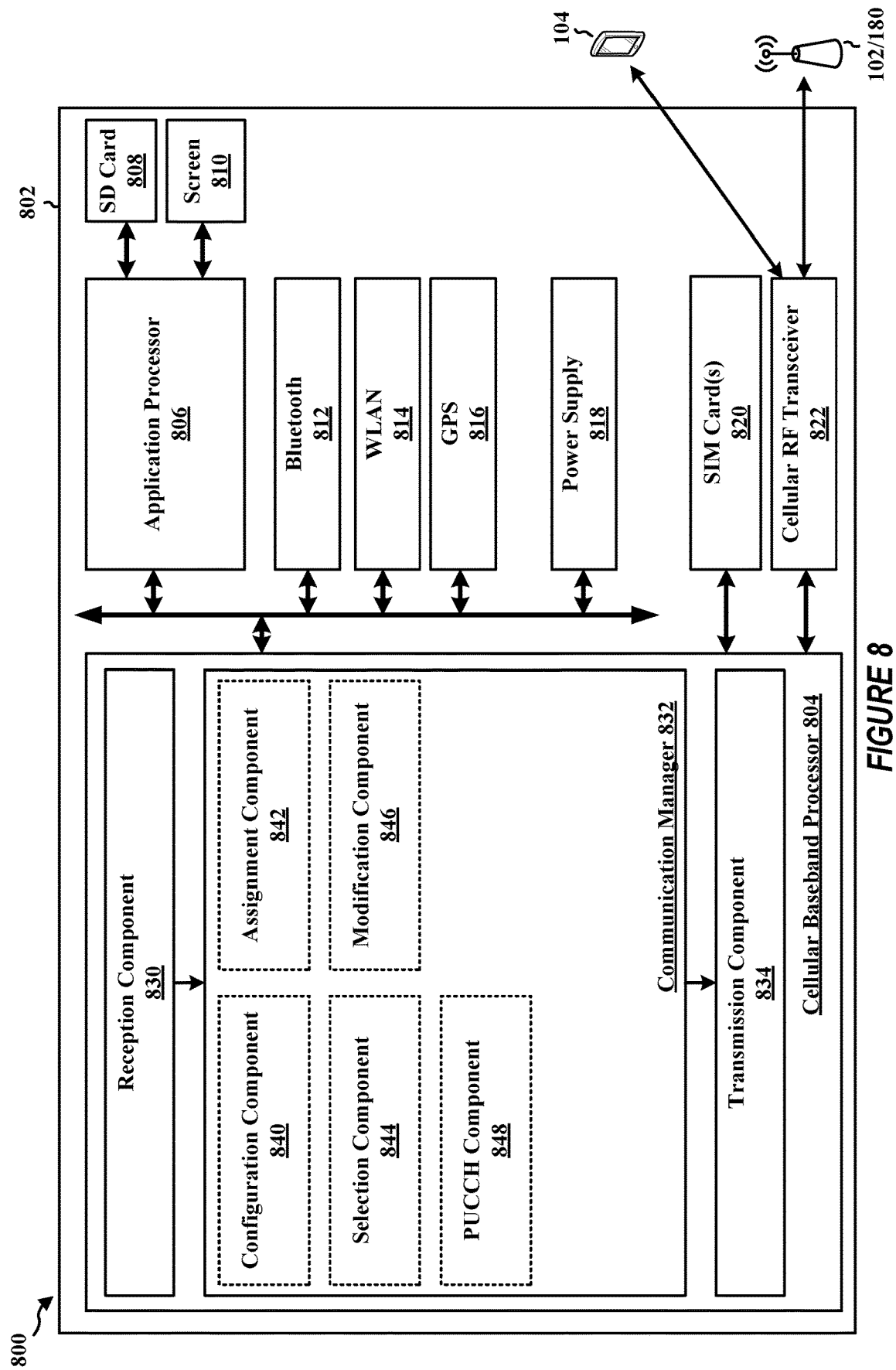
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory also may be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (such as UE 350 of FIG. 3) and include the aforediscussed additional modules of the apparatus 802.

The communication manager 832 includes a configuration component 840 that is configured to receive a configuration for a DCI that schedules a first PDSCH and includes a PRI indicating a repetition factor of a first PUCCH associated with the first PDSCH and at least one additional PUCCH, such as described in connection with 702 of FIG. 7. The communication manager 832 further includes an assignment component 842 that is configured to receive a configuration assigning the PUCCH resource sets into a plurality of different groups, such as described in connection with 704 of FIG. 7. The communication manager 832 further includes a selection component 844 that is configured to receive an indication of a selection of a first PUCCH resource set from the first group or the second group, such as described in connection with 706 of FIG. 7. The communication manager 832 further includes a modification component 846 that is configured to modify transmission of the at least one additional PUCCH, such as described in connection with 708 of FIG. 7. The communication manager 832 further includes a PUCCH component 848 that is configured to transmit the at least one additional PUCCH to a base station, such as described in connection with 710 of FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving a configuration for DCI that schedules a first PDSCH and includes a PRI indicating a repetition factor of a first PUCCH associated with the first PDSCH and at least one additional PUCCH. The apparatus includes means for modifying transmission of the at least one additional PUCCH associated with the repetition factor of the first PUCCH. The apparatus includes means for transmitting the at least one additional PUCCH, to a base station. The at least one additional PUCCH is transmitted with the repetition factor based on a preconfiguration of PUCCH resource sets and a selection of a PUCCH resource set by the PRI. The apparatus further includes means for receiving a configuration assigning the PUCCH resource sets into a plurality of different groups. Each of the plurality of different groups is associated with a different repetition factor. The plurality of different groups including at least a first group and a second group. The apparatus further includes means for receiving an indication of a selection of a first PUCCH resource set from the first group or the second group. Selection of the first PUCCH resource set switches the repetition factor of other PUCCH resource sets to the repetition factor associated with the group from which the first PUCCH resource set is selected. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 9:
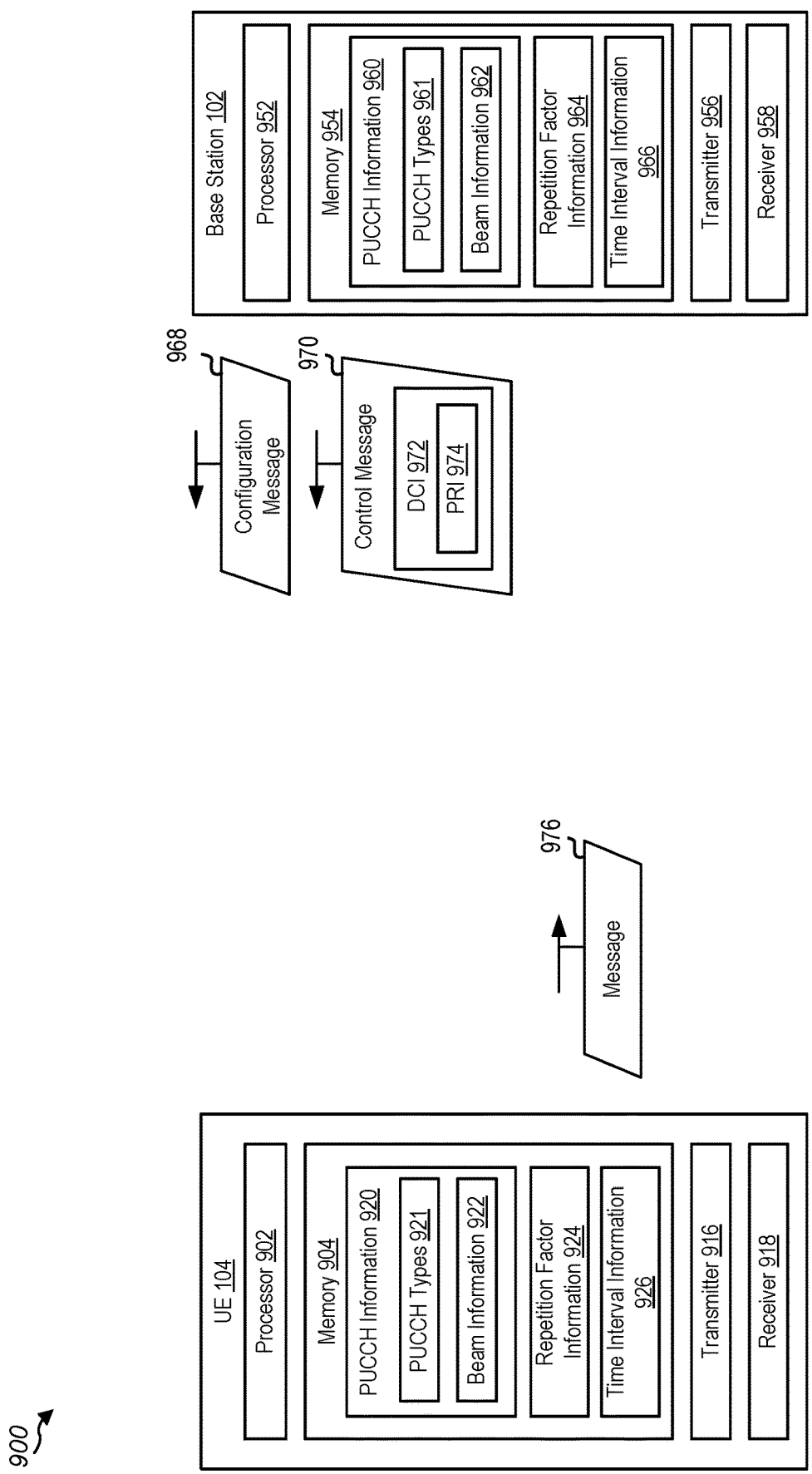
FIG. 9 is a block diagram illustrating an example wireless communication system that supports physical uplink control channel (PUCCH) resource indicator (PRI) for a repetition factor.

FIG. 9 is a block diagram of an example wireless communications system 900 that supports PRI for a repetition factor. In some examples, the wireless communications system 900 may implement aspects of the wireless network 100. The wireless communications system 900 includes the UE 104 and the base station 102. Although one UE 104 and one base station 102 are illustrated, in some other implementations, the wireless communications system 900 may generally include multiple UEs 104, and may include more than one base station 102. The base station 102 of FIG. 9 may include or correspond to the base station 102 of FIG. 1, the base station 310 of FIG. 3, the base station 404 of FIG. 4, or the apparatus 602 of FIG. 6. The UE 104 of FIG. 9 may include or correspond to the UE 104 of FIG. 1, the UE 350 of FIG. 3, the UE 402 of FIG. 4, or the apparatus 802 of FIG. 8.

The UE 104 can include a variety of components (such as structural, hardware components) used for carrying out one or more functions described herein. For example, these components can include one or more processors 902 (hereinafter referred to collectively as "the processor 902"), one or more memory devices 904 (hereinafter referred to collectively as "the memory 904"), one or more transmitters 916 (hereinafter referred to collectively as "the transmitter 916"), and one or more receivers 918 (hereinafter referred to collectively as "the receiver 918"). The processor 902 may be configured to execute instructions stored in the memory 904 to perform the operations described herein. In some implementations, the processor 902 includes or corresponds to one or more of the receive processor 356, the transmit processor 368, and the controller/processor 359, and the memory 904 includes or corresponds to the memory 360.

The memory 904 includes or is configured to store PUCCH information 920, repetition factor information 924, and time interval information 926. In some implementations, the PUCCH information 920 may be configured a PUCCH resource set. Additionally, or alternatively, the PUCCH may be modified during operation, such as dynamically updated based on DCI or a medium access control-control element (MAC-CE), as illustrative, non-limiting examples. The PUCCH information 920 may include PUCCH types 921 and beam information 922.

The PUCCH types 921 may include PUCCH carrying ACK/NACK for a scheduled PDSCH, and PUCCHs other than the PUCCH carrying ACK/NACK for the scheduled PDSCH. The PUCCHs other than the PUCCH carrying ACK/NACK for the scheduled PDSCH may include ACK/NACK for a scheduled PDCCH, ACK/NACK for SPS, CSI on PUCCH, an SR, or a combination thereof, as illustrative, non-limiting examples. In some implementations, the PUCCH types 921 include one or more PUCCH types selected from the group including PUCCH carrying ACK/NACK for a scheduled PDSCH, ACK/NACK for a scheduled PDCCH, ACK/NACK for SPS, CSI on PUCCH, and an SR. In some other implementations, the one or more PUCCH types may be selected from another group that includes one or more fewer of the PUCCH carrying the ACK/NACK for the scheduled PDSCH, the ACK/NACK for the scheduled PDCCH, the ACK/NACK for the SPS, the CSI on PUCCH, and the SR. Additionally, although PUCCH types 921 is described as multiple PUCCH types, in some implementations, PUCCH type 921 may include at least one PUCCH type, such as a single PUCCH type. The at least one PUCCH type may include a PUCCH other than PUCCH carrying ACK/NACK for a scheduled PDSCH.

The beam information 922 may include or indicate one or more beams, such as one or more beam configurations. To illustrate, the one or more beam configurations may include a beam pattern, a transmit power, or a combination thereof, as illustrative, non-limiting examples. A beam of the one or more beams may be used for an associated PUCCH, an associated PDSCH (in situations where PUCCH carries ACK/NACK), or a combination thereof.

The repetition factor information 924 may include or indicate one or more repetition factors. In some implementations, the repetition factor information 924 indicates, for each PUCCH type of the PUCCH types 921, an associated repetition factor. In some implementations, the repetition factor information 924 may include multiple sets of repetition factors for different sets of PUCCH types. To illustrate, each set of repetition factors, such as a set of one or more repetition factors, may be associated with an index value. For example, a first index value may correspond to a first set of one or more repetition factors for a first set of one or more PUCCH types. A second index value may correspond to a second set of one or more repetition factors a second set of one or more PUCCH types. A third index value may correspond to a third set of one or more repetition factors for the second set of one or more PUCCH types. A fourth index value may correspond to a single repetition factor of each PUCCH type of a fourth set of one or more PUCCH types. It is noted that the described index values are for purposes of illustration only and are not to be limiting such that other implementations of an index value scheme are possible. In some implementations, the repetition factor information 924, or a repetition factor of an associated PUCCH type may be preconfigured, such as according to a standard, configured based on a configuration message, such as a radio resource control (RRC) message, dynamically determined based on a control message, or a combination thereof. In some implementations, the repetition factor information 924 may include or indicate one or more repetition factors for one or more PUCCH types based on a PUCCH resource set, PUCCH format, a UCI size, UCI content, or a combination thereof.

The time interval information 926 may include or indicate one or more time intervals that indicate a time period (or a duration) during which a repetition factor is valid. A time interval of validity of a PUCCH repetition factor may depend on a PUCCH resource set, PUCCH format, a UCI size, UCI content, or a combination thereof. It is noted that if a repetition factor is update or overwritten, a time interval of the prior repetition factor may be ceased and a new time interval associated with the updated repetition factor may begin.

The transmitter 916 is configured to transmit reference signals, control information and data to one or more other devices, and the receiver 918 is configured to receive references signals, synchronization signals, control information and data from one or more other devices. For example, the transmitter 916 may transmit signaling, control information and data to, and the receiver 918 may receive signaling, control information and data from, the base station 102. In some implementations, the transmitter 916 and the receiver 918 may be integrated in one or more transceivers. Additionally or alternatively, the transmitter 916 or the receiver 918 may include or correspond to one or more components of the UE 350 described with reference to FIG. 3.

The base station 102 can include a variety of components (such as structural, hardware components) used for carrying out one or more functions described herein. For example, these components can include one or more processors 952 (hereinafter referred to collectively as "the processor 952"), one or more memory devices 954 (hereinafter referred to collectively as "the memory 954"), one or more transmitters 956 (hereinafter referred to collectively as "the transmitter 956"), and one or more receivers 958 (hereinafter referred to collectively as "the receiver 958"). The processor 952 may be configured to execute instructions stored in the memory 954 to perform the operations described herein. In some implementations, the processor 952 includes or corresponds to one or more of the receive processor 370, the transmit processor 316, and the controller/processor 375, and the memory 954 includes or corresponds to the memory 376.

The memory 954 includes or is configured to store PUCCH information 960, repetition factor information 964, and time interval information 966. The PUCCH information 960, the repetition factor information 964, and the time interval information 966 may include or correspond to the PUCCH information 920, the repetition factor information 924, and the time interval information 926, respectively. The PUCCH information 960 includes PUCCH types 961 and beam information 962. The PUCCH types 921 and the beam information 922 may include or correspond to the PUCCH types 921 and the beam information 922, respectively.

The transmitter 956 is configured to transmit reference signals, synchronization signals, control information and data to one or more other devices, and the receiver 958 is configured to receive reference signals, control information and data from one or more other devices. For example, the transmitter 956 may transmit signaling, control information and data to, and the receiver 958 may receive signaling, control information and data from, the UE 104. In some implementations, the transmitter 956 and the receiver 958 may be integrated in one or more transceivers. Additionally or alternatively, the transmitter 956 or the receiver 958 may include or correspond to one or more components of base station 310 described with reference to FIG. 3.

In some implementations, the wireless communications system 900 implements a 5G New Radio (NR) network. For example, the wireless communications system 900 may include multiple 5G-capable UEs 104 and multiple 5G-capable base stations 102, such as UEs and base stations configured to operate in accordance with a 5G NR network protocol such as that defined by the 3GPP.

During operation of the wireless communications system 900, the base station 102 transmits a configuration message 968 to the UE 104. The configuration message 968 may include or correspond to an RRC message or RRC signaling. In some implementations, the configuration message 968 may include or indicate a PUCCH resource set, one or more repetition factors, scheduling information, such as PDSCH, or a combination thereof, as illustrative, non-limiting examples. Although the base station 102 is described as transmitting the configuration message 968, in other implementations, transmission of the control message 970 by the base station 102 is optional and may not be performed. In some implementations, the configuration message may include beam information 962, time interval information 966, or a combination thereof. The UE 104 may receive the configuration message 968 and configure one or more parameters of the UE 104 based on the configuration message 968.

The base station 102 may select one or more repetition factors based on the repetition factor information 964. For example, the base station 102 may select a set of one or more repetition factors for a set of one or more PUCCH types. The one or more PUCCH types may include at least one PUCCH type other than PUCCH carrying ACK/NACK for a scheduled PDSCH. In some implementations, the set of one or more repetition factors for the set of one or more PUCCH types may be associated with an index value, such as an index value of a set of predefined index values where each index value corresponds to a predefined option. Additionally, or alternatively, selecting the one or more repetition factors may include determining whether to increase or decrease a current set of one or more repetition factors. In such implementations, the index value may correspond to an amount to increase or decrease the current set of one or more replication factors.

In some implementations, the base station 102 may select the one or more repetition factors based on UCI, interference, or a combination thereof. For example, if a measured interference value is greater than or equal to a threshold, the base station 102 may increase an existing repetition value for a PUCCH type. In some implementations, a repetition factor may be selected for a PUCCH type based on performance, a signal-to-interference-plus-noise ratio (SINR), or a combination thereof. To illustrate, different PUCCH formats and different UCI payloads may have different performance considerations or requirements.

The base station 102 generates DCI 972 that includes PRI 974, such as an enhanced PRI. The PRI 974 may include or correspond to a repetition indicator, such as a repetition indicator that indicates or is associated with a repetition factor. In some implementations, the PRI 974 includes a bitfield of one or more bits. The base station 102 may populate the bitfield, such as a portion or an entirety of the bitfield, to indicate a value of the one or more repetition factors. The value may correspond to an index value associated with the selected set of one or more repetition factors for the set of one or more PUCCH types. In some implementations, the value, or a portion of the bitfield, may include or correspond to the repetition indicator. Additionally, or alternatively, in some implementations, the bitfield may be the same size as a conventional PRI bitfield associated with a repetition factor of PUCCH carrying ACK/NACK for a scheduled PDSCH. In some other implementations, the bitfield may include a first portion that correspond to the conventional PRI bitfield and a second portion of one or more bits that indicates the index value. It is noted that an index value may represent a first repetition factor of a first PUCCH type and a second repetition factor of a second PUCCH type, where the first repetition factor and the second repetition factor are the same value or different values. Although PRI 974, such as a set of one or more bits, is described as being included in DCI, in other implementations, PRI 974 or a set of one or more bits associated with PRI 974, may be included in RRC or a medium access control-control element (MAC-CE) to indicate a repetition factor of one or more PUCCH types, such as dynamically indicate a repetition factor of multiple PUCCH types.

The base station 102 generates a control message 970 that includes the DCI 972 and transmits the control message 970. Transmission of the control message 970 may enable the base station 102 to indicate one or more dynamic PUCCH repetition factors as part of the PRI 974, such as an enhanced PRI bitfield, in the DCI 972.

The UE 104 receives the control message 970 and parses the control message 970 to identify the PRI 974. Based on the PRI 974, such as the bitfield of the PRI 974, the UE 104 may determine the set of one or more repetition factors (for the set of one or more PUCCH types) indicated by the base station 102. The UE 104 may update the repetition factor information 924 to indicate the new set of one or more repetition factors to be used. The UE 104 may maintain the new set of one or more repetition factors for a time interval based on the time interval information 926 or until the one or more repetition factors are overwritten. For example, the UE 104 may overwrite the one or more repetition factors based on receipt of a new configuration message 968 or a new control message 970 (including a PRI 974, such as an enhanced PRI).

The UE 104 may transmit one or more messages, such as a representative massage 976, based on the set of one or more repetition factors. For example, the message 976 may be associated with a PUCCH type and the UE 104 may repeat transmission of the message 976 a number of times based on a repetition factor of the PUCCH type. In some implementations, the UE 104 may use the repetition factor indicated by the PRI for a time interval, based on a beam, based on PUCCH resource set, a PUCCH format, a UCI size, UCI content, or a combination thereof. For example, the UE 104 may determine the PUCCH type of the message 976, whether a time interval applies, a beam for transmitting the message, a PUCCH resource set, a PUCCH format associated with the message 976, a UCI size associated with the message 976, UCI content associated with the message 976, or a combination thereof. Based on the determination by the UE 104, the UE 104 may select and apply the repetition factor indicated by the PRI 974 or another repetition factor.

In some implementations, the set of one or more repetition factors indicated by the PRI 974 may be associated with PUCCH having a time interval or a set of time intervals. The time interval of validity of PUCCH repetition factor may depend on the PUCCH resource set, PUCCH format, UCI size, UCI content, or a combination thereof. For example, one or more time intervals may have been indicated by a PUCCH resource set. As another example, the time interval information 926 may indicate a time interval for a PUCCH type or a PUCCH format. To illustrate, a first PUCCH format, such as PUCCH format 3, may have a first time interval and be valid for 1 millisecond (ms), and a second PUCCH format, such as PUCCH format may have a second time interval and be valid for 10 ms, as illustrate, non-limiting examples. As another example, a repetition factor indicated by the PRI 974 may be valid for a time period for CSI on PUCCH, but no time period may be applicable for ACK/NACK on SPS. As another example, the time interval information may be based on UCI content. To illustrate, a first PUCCH type, such as CSI on PUCCH, may be valid for a longer time period than an ACK/NACK.

In some implementations, the PRI 974 may indicate whether or not a time interval is enabled or disabled, a duration of a time interval, or a combination thereof. For example, at least a portion of a bitfield of the PRI 974 may include a value, such as an index value, that indicates a time interval for each of one or more PUCCH types, a duration of the time interval, whether the time interval is enabled or disabled, or a combination thereof. If a time interval is enable for PUCCH type, after expiration of the time interval, the UE 104 may revert back to a pre-configured repetition factor, such as repetition factor of a standard, or a previous repetition factor, such as a repetition factor indicated by the configuration message 968 or a repetition factor that was most recent prior to receipt of the PRI 974.

In some implementations, the repetition factor indicated by the PRI 974, such as a PRI bitfield, may depend on an associated beam, such as a beam that is used for that PUCCH, a beam for its associated PDSCH (for the case of PUCCH that carries ACK/NACK), or a combination thereof. For example, a configuration of a PUCCH resource set may indicate different repetition factors for different beams and the PRI 974 may affect the repetition factor accordingly. To illustrate, the PUCCH resource set may indicate a first repetition factor of a first beam and a second repetition factor of a second beam, and the PRI 974 may indicate to increase, by a factor of 0.5, 1, 2, 3, etc., a first repetition factor of a first beam and decrease, by a factor of 0.5, 1, 2, 3, etc., a second repetition factor of the second beam. In some implementations, a resulting repetition may be an integer or will be rounded up or down to an integer. As another example, the PUCCH repetition factor indicated by the PRI 974, such as by the bitfield of the PRI 974 may be valid for PUCCHs that are associated with the same beam as the PUCCH carrying ACK/NNACK for the scheduled PDSCH, such as PDSCH scheduled by the DCI 972 that includes that PRI 974.

In some implementations, the repetition factor indicated by the PRI 974 may depend on the PUCCH resource set, PUCCH format, UCI size, UCI content. For example, a repetition factor indicated by the PRI 974 may increase, maintain, decrease a preconfigured repetition factor, such as a repetition factor indicated by a standard or by the configuration message 968, for a PUCCH format. As another example, a repetition factor indicated by the PRI 974 may increase, maintain, or decrease a preconfigured repetition factor of a PUCCH resource set. As another example, a repetition factor indicated by the PRI 974 may be applicable to CSI, ACK/NACK for SPS, SR, or a combination thereof.

As described with reference to FIG. 9, the present disclosure provides techniques for supporting the PRI 974, such as enhanced PRI associated with a PUCCH repetition factor, for multiple PUCCH types. The PRI 974 may be included in the DCI 972 and enable dynamic PUCCH repetition factor indication for one or more PUCCHs that do not have an associated DCI. The dynamic PUCCH repetition factor may reduce overhead and signaling to set or update a repetition factor of multiple PUCCH types as compared to a conventional PRI.

Figure 10:
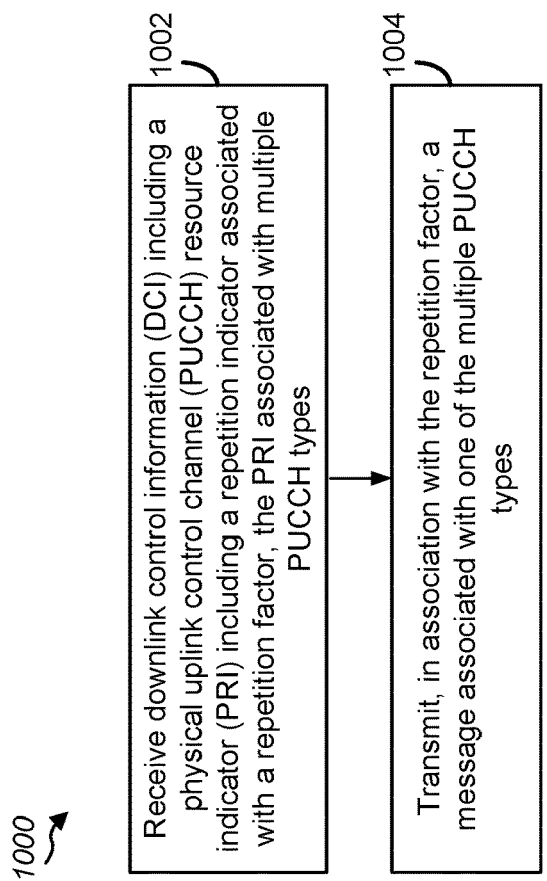
FIG. 10 is a flow diagram illustrating an example process of UE operations for communication.

FIG. 10 is a flow diagram illustrating an example process 1000 of UE operations for communication. Operations of the process 1000 may be performed by a UE, such as the UE 104 described above with reference to FIG. 1 or 9, the UE 350 of FIG. 3, the UE 402 of FIG. 4, the apparatus 802 of FIG. 8, or a UE as described with reference to FIG. 11. For example, example operations (also referred to as "blocks") of the process 1000 may enable the UE 104 to support a PRI for a repetition factor, such as an enhanced repetition factor associated with a PUCCH repetition factor. To illustrate, the PRI may be associated with multiple PUCCH types.

In block 1002, the UE receives DCI including a PRI including a repetition indicator associated with a repetition factor, the repetition factor associated with multiple PUCCH types. For example, the DCI and the PRI may include or correspond to the DCI 972 and the PRI 974. The multiple PUCCH types may include or correspond to the PUCCH types 921 or the PUCCH types 961.

In block 1004, the UE transmits, in association with the repetition factor, a message associated with one of the multiple PUCCH types. For example, the message may include or correspond to the message 976.

Figure 11:
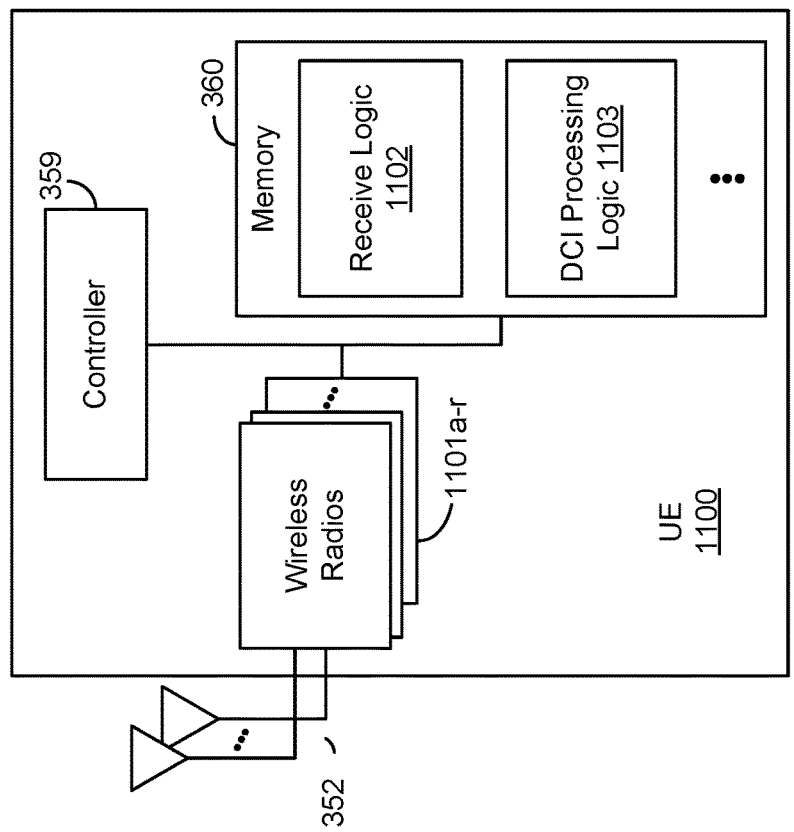
FIG. 11 is a block diagram conceptually illustrating a design of a UE.

FIG. 11 is a block diagram conceptually illustrating a design of a UE 1100. The UE 1100 may be configured to perform operations, including the blocks of the process 1000 described with reference to FIG. 10. In some implementations, the UE 1100 includes the structure, hardware, and components shown and described with reference to the UE 350 of FIG. 3 or the UE 104 of 9. For example, the UE 1100 includes the controller/processor 359, which operates to execute logic or computer instructions stored in the memory 360, as well as controlling the components of the UE 1100 that provide the features and functionality of the UE 1100. The UE 1100, under control of the controller/processor 359, transmits and receives signals via wireless radios 1101a-r and the antennas 352. The wireless radios 1101a-r include various components and hardware, as illustrated in FIG. 3 for the UE 350, including the receiver 354 RX, the receive processor 356, the transmitter 354 TX, the transmit processor 368, or a combination thereof.

As shown, the memory 360 may include receive logic 1102 and DCI processing logic 1103. The receive logic 1102 may be configured to receive a control message, such as control message 970, or DCI, such as DCI 972. The DCI processing logic 1103 may be configured to process DCI, such as DCI 972. For example, the DCI processing logic 1103 may identify a PRI included in the DCI, determine a repetition factor of one or more PUCCH types based on the PRI, or a combination thereof. The UE 1100 may receive signals from or transmit signals to one or more network entities, such as the base station 102 of FIG. 1 or 9, the base station 310 of FIG. 3, the base station 404 of FIG. 4, the apparatus 602 of FIG. 6, or a base station as illustrated in FIG. 13.

In some implementations, the UE 1100 may be configured to perform the process 1000 of FIG. 10. To illustrate, the UE 1100 may execute, under control of the controller/processor 359, the receive logic 1102 and the DCI processing logic 1103 stored in the memory 360. The execution environment of the receive logic 1102 provides the functionality to perform at least the operations in block 1002. The execution environment of the DCI processing logic 1103 provides the functionality to perform at least the operations in block 1004.

Figures 12, 13:
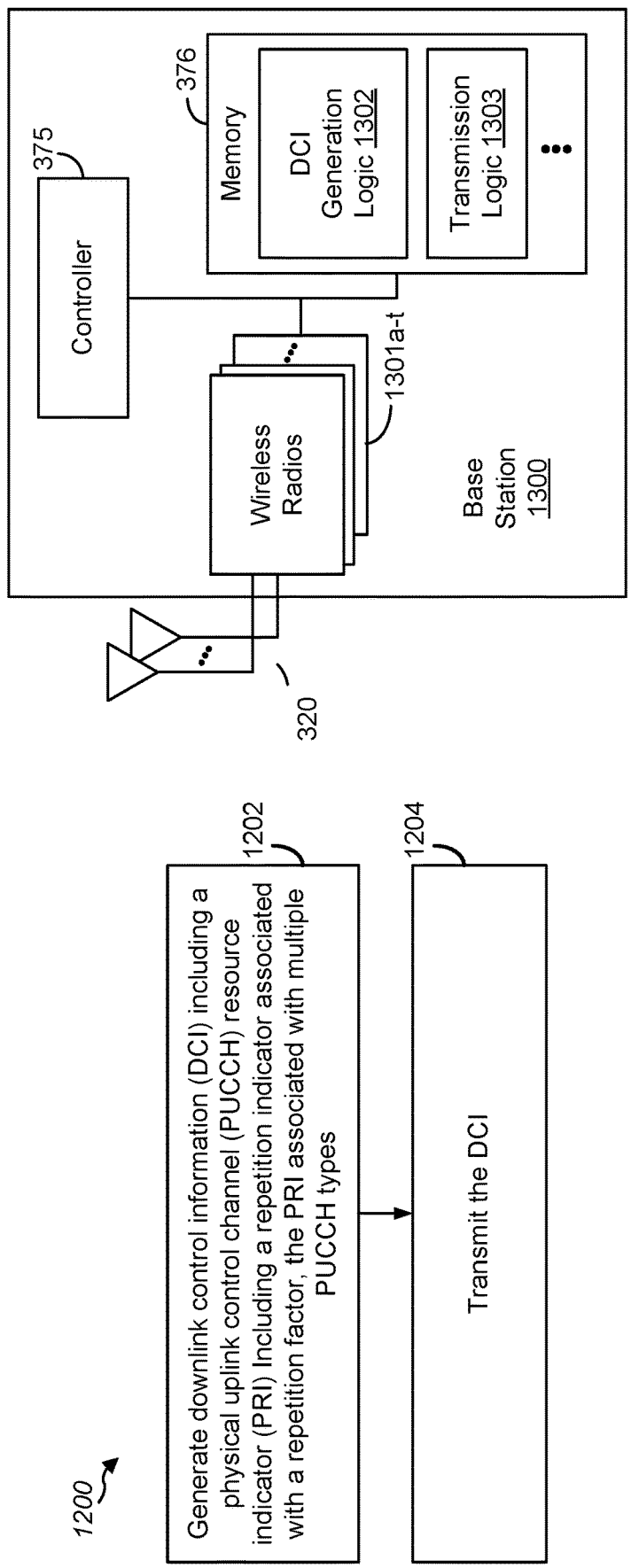
FIG. 12 is a flow diagram illustrating an example process of BS operations for communication.
FIG. 13 is a block diagram conceptually illustrating a design of a BS.

FIG. 12 is a flow diagram illustrating an example process 1200 of base station operations for communication. Operations of the process 1200 may be performed by a base station, such as the base station 102 of FIG. 1 or 9, the base station 310 of FIG. 3, the base station 404 of FIG. 4, the apparatus 602 of FIG. 6, or a base station as illustrated in FIG. 13. For example, example operations of the process 1200 may enable the base station 102 to support a PRI for a repetition factor, such as an enhanced repetition factor associated with a PUCCH repetition factor. To illustrate, the PRI may be associated with multiple PUCCH types.

In block 1202, the base station generates DCI including a PRI including a repetition indicator associated with a repetition factor, the repetition indicator associated with multiple PUCCH types. For example, the DCI and the PRI may include or correspond to the DCI 972 and the PRI 974. The multiple PUCCH types may include or correspond to the PUCCH types 921 or the PUCCH types 961.

In block 1204, the base station transmits the DCI. For example, the base station may transmit the DCI in a control message, such as the control message 970. The control message may include an RRC message, a MAC-CE, or the like.

FIG. 13 is a block diagram conceptually illustrating a design of a base station 1300. The base station 1300 may be configured to perform operations, including the blocks of the process 1200 described with reference to FIG. 12. In some implementations, the base station 1300 includes the structure, hardware, and components shown and described with reference to the base station 102 of FIG. 1 or 9, the base station 310 of FIG. 3, the base station 404 of FIG. 4, or the apparatus 602 of FIG. 6. For example, the base station 1300 may include the controller/processor 375, which operates to execute logic or computer instructions stored in the memory 376, as well as controlling the components of the base station 1300 that provide the features and functionality of the base station 1300. The base station 1300, under control of the controller/processor 375, transmits and receives signals via wireless radios 1301a-t and the antennas 318. The wireless radios 1301a-t include various components and hardware, as illustrated in FIG. 3 for the base station 310, including the transmitter 318 TX, the transmit processor 316, the receiver 318 RX, the receive processor 370, or a combination thereof.

As shown, the memory 376 may include DCI generation logic 1302 and transmission logic 1303. The DCI generation logic 1302 may be configured to generate DCI, such as the DCI 972. The DCI may include a PRI, such as the PRI 974, associated with a repetition factor of one or more PUCCH types. The transmission logic 1303 is configured to transmit DCI, one or more messages, such as a control message 970, or a combination thereof. The base station 1300 may receive signals from or transmit signals to one or more UEs, such as the UE 104 of FIG. 1 or 9, the UE 350 of FIG. 3, the apparatus 802 of FIG. 8, or the UE 1100 of FIG. 11.

In some implementations, the base station 1300 may be configured to perform the process 1200 of FIG. 12. To illustrate, the base station 1300 may execute, under control of the controller/processor 375, the DCI generation logic 1302 and the transmission logic 1303 stored in the memory 376. The execution environment of the DCI generation logic 1302 provides the functionality to perform at least the operations in block 1202. The execution environment of the transmission logic 1303 provides the functionality to perform at least the operations in block 1204.

It is noted that one or more blocks (or operations) described with reference to FIGS. 4, 5, 7, 10, and 12 may be combined with one or more blocks (or operations) described with reference to another of the figures. For example, one or more blocks (or operations) of FIG. 10 may be combined with one or more blocks (or operations) of FIG. 12. As another example, one or more blocks associated with FIG. 5 or 7 may be combined with one or more blocks (or operations) associated with FIG. 4, 10, or 12. Additionally, or alternatively, one or more operations described above with reference to FIGS. 4, 5, 7, 10, and 12 may be combined with one or more operations described with reference to FIG. 1, 2, 6, 8, 9, 11, or 13.

The following examples are illustrative only and may be combined with aspects of other implementation or teachings described herein, without limitation.

In some aspects, techniques for supporting a PRI may include additional aspects, such as any single aspect or any combination of aspects described below or in connection with one or more other processes or devices described elsewhere herein. In a first aspect, techniques for supporting a PRI may include configuring DCI that schedules a first PDSCH and includes a PRI indicating a repetition factor of a first PUCCH associated with the first PDSCH and at least one additional PUCCH; transmitting the DCI having the PRI to at least one user equipment (UE); and monitoring for the at least one additional PUCCH, from the at least one UE, wherein the at least one additional PUCCH is transmitted with a repetition factor based on a preconfiguration of PUCCH resource sets and a selection of a PUCCH resource set by the PRI. In some examples, the techniques in the first aspect may be implemented in a method or process. In some other examples, the techniques of the first aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the at least one additional PUCCH is associated with a periodic CSI or an SPS feedback.

In a third aspect, in combination with the first aspect or the second aspect, the at least one additional PUCCH is associated with at least one additional PDSCH other than the first PDSCH scheduled by the DCI.

In a fourth aspect, in combination with one or more of the first aspect through the third aspect, that the repetition factor is used to configure the at least one additional PUCCH based on a configuration of the first PUCCH.

In a fifth aspect, in combination with one or more of the first aspect through the fourth aspect, the repetition factor of the at least one additional PUCCH is a factor of the repetition factor of the first PUCCH.

In a sixth aspect, in combination with one or more of the first aspect through the fifth aspect, the repetition factor is used to configure the at least one additional PUCCH based on a format of the at least one additional PUCCH.

In a seventh aspect, in combination with one or more of the first aspect through the sixth aspect, different PUCCH formats of the at least one additional PUCCH have different repetition factors.

In an eighth aspect, in combination with one or more of the first aspect through the seventh aspect, the repetition factor is used to configure the at least one additional PUCCH based on a size of a UCI or based on a content of the UCI.

In a ninth aspect, in combination with one or more of the first aspect through the eighth aspect, the techniques further include assigning the PUCCH resource sets into a plurality of different groups, wherein each of the plurality of different groups is associated with a different repetition factor, the plurality of different groups including at least a first group and a second group; and selecting a first PUCCH resource set from the first group or the second group, where selection of the first PUCCH resource set switches the repetition factor of other PUCCH resource sets to the repetition factor associated with the group from which the first PUCCH resource set is selected.

In a tenth aspect, in combination with one or more of the first aspect through the ninth aspect, the first PUCCH resource set is selected from the first group having a first repetition factor, wherein the repetition factor of the other PUCCH resource sets is switched to the first repetition factor.

In an eleventh aspect, in combination with one or more of the first aspect through the tenth aspect, the repetition factor is valid until overwritten by another PRI.

In a twelfth aspect, in combination with one or more of the first aspect through the eleventh aspect, the repetition factor is valid for a time duration, wherein the time duration is determined based on the selected resource set.

In some aspects, techniques for supporting a PRI may include additional aspects, such as any single aspect or any combination of aspects described below or in connection with one or more other processes or devices described elsewhere herein. In a thirteenth aspect, techniques for supporting a PRI may include receiving a configuration for DCI that schedules a first PDSCH and includes a physical uplink control channel (PUCCH) resource indicator (PRI) indicating a repetition factor of a first PUCCH associated with the first PDSCH and at least one additional PUCCH; modifying transmission of the at least one additional PUCCH associated with the repetition factor of the first PUCCH; and transmitting the at least one additional PUCCH, to a base station, wherein the at least one additional PUCCH is transmitted with the repetition factor based on a preconfiguration of PUCCH resource sets and a selection of a PUCCH resource set by the PRI. In some examples, the techniques in the thirteenth aspect may be implemented in a method or process. In some other examples, the techniques of the thirteenth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a fourteenth aspect, in combination the thirteenth aspect, the at least one additional PUCCH is associated with a periodic CSI or a SPS feedback.

In a fifteenth aspect, in combination with one or more of the thirteenth aspect or the fourteenth aspect, the at least one additional PUCCH is associated with at least one additional PDSCH other than the first PDSCH scheduled by the DCI.

In a sixteenth aspect, in combination with one or more of the thirteenth aspect through the fifteenth aspect, the repetition factor is used to configure the at least one additional PUCCH based on a configuration of the first PUCCH.

In a seventeenth aspect, in combination with one or more of the thirteenth aspect through the sixteenth aspect, the repetition factor of the at least one additional PUCCH is a factor of the repetition factor of the first PUCCH.

In an eighteenth aspect in combination with one or more of the thirteenth aspect through the seventeenth aspect, the repetition factor is used to configure the at least one additional PUCCH based on a format of the at least one additional PUCCH.

In a nineteenth aspect, in combination with one or more of the thirteenth aspect through the eighteenth aspect, different PUCCH formats of the at least one additional PUCCH have different repetition factors.

In a twentieth aspect, in combination with one or more of the thirteenth aspect through the nineteenth aspect, the repetition factor is used to configure the at least one additional PUCCH based on a size of a UCI or based on a content of the UCI.

In a twenty-first aspect, in combination with one or more of the thirteenth aspect through the twentieth aspect, the techniques further include receiving a configuration assigning the PUCCH resource sets into a plurality of different groups, where each of the plurality of different groups is associated with a different repetition factor, the plurality of different groups including at least a first group and a second group; and receiving an indication of a selection of a first PUCCH resource set from the first group or the second group, where selection of the first PUCCH resource set switches the repetition factor of other PUCCH resource sets to the repetition factor associated with the group from which the first PUCCH resource set is selected.

In a twenty-second aspect, in combination with one or more of the thirteenth aspect through the twenty-first aspect, the first PUCCH resource set is selected from the first group having a first repetition factor, where the repetition factor of the other PUCCH resource sets is switched to the first repetition factor.

In a twenty-third aspect, in combination with one or more of the thirteenth aspect through the twenty-second aspect, the repetition factor is valid until overwritten by another PRI.

In a twenty-fourth aspect, in combination with one or more of the thirteenth aspect through the twenty-third aspect, the repetition factor is valid for a time duration, wherein the time duration is determined based on the selected resource set.

In some aspects, techniques for supporting a PRI for a repetition factor may include additional aspects, such as any single aspect or any combination of aspects described below or in connection with one or more other processes or devices described elsewhere herein. In a twenty-fifth aspect, techniques for supporting a PRI may include receiving DCI including a PRI of a repetition factor. The PRI is associated with multiple PUCCH types. The techniques further include, transmitting, associated with the repetition factor, a message associated with one of the multiple PUCCH types. In some examples, the techniques in the twenty-fifth aspect may be implemented in a method or process. In some other examples, the techniques of the twenty-fifth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In some aspects, techniques for supporting a PRI may include additional aspects, such as any single aspect or any combination of aspects described below or in connection with one or more other processes or devices described elsewhere herein. In a twenty-sixth aspect, techniques for supporting a PRI may include generating DCI including a PRI of a repetition factor. The PRI associated with multiple PUCCH types. The techniques further include transmitting the DCI. In some examples, the techniques in the twenty-sixth aspect may be implemented in a method or process. In some other examples, the techniques of the twenty-sixth aspect may be implemented in a wireless communication device such as a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a twenty-seventh aspect, in combination with the twenty-fifth aspect or the twenty-sixth aspect, the multiple PUCCH types include ACK/NACK for a scheduled PDCCH, ACK/NACK for SPS, CSI on PUCCH, an SR, or a combination thereof.

In a twenty-eighth aspect, in combination with one or more of the twenty-fifth aspect through the twenty-seventh aspect, a value of the PRI indicates an index associated with a repetition factor of each type of the multiple PUCCH types.

In a twenty-ninth aspect, in combination with the twenty-eighth aspect, the PRI includes a bit field that represents the index.

In a thirtieth aspect, in combination with one or more of the twenty-fifth aspect through the twenty-ninth aspect, the PRI is valid for one or more time intervals.

In a thirty-first aspect, in combination with the thirtieth aspect, a duration of at least one interval of the one or more time intervals is based on a PUCCH resource set, a PUCCH format, a UCI size, UCI content, or a combination thereof.

In a thirty-second aspect, in combination with one or more of the twenty-fifth aspect through the thirty-first aspect, the PRI is based on a beam associated with PUCCH, a beam associated with PDCCH of an ACK/NACK, or a combination thereof.

In a thirty-third aspect, in combination with the thirty-second aspect, a value associated with the PRI indicates different repetition factors for different beams based on a configuration of a PUCCH resource set.

In a thirty-fourth aspect, in combination with the thirty-second aspect, a value of the PRI is associated with a repetition factor that is valid for PUCCHs that are associated with the same beam as the PUCCH carrying ACK/NACK for scheduled PDSCH.

In a thirty-fifth aspect, in combination with one or more of the twenty-fifth aspect through the thirty-fourth aspect, the repetition factor indicated by the PRI is based on a PUCCH resource set, a PUCCH format, a UCI size, UCI content, or a combination thereof.

In some aspects, techniques for supporting a PRI may include additional aspects, such as any single aspect or any combination of aspects described below or in connection with one or more other processes or devices described elsewhere herein. In a thirty-sixth aspect, techniques for supporting a PRI may include receiving a first configuration for DCI that schedules a first PDSCH and includes PRI indicating a repetition factor of a first PUCCH associated with the first PDSCH and at least one additional PUCCH. The techniques further include receiving a second configuration assigning a plurality of PUCCH resources into a plurality of different groups, each of the plurality of different groups associated with a different repetition factor, the plurality of different groups including at least a first group and a second group. The techniques also include receiving an indication of a selection of a first PUCCH resource from the first group or the second group, wherein selection of the first PUCCH resource switches the repetition factor of other PUCCH resources to the repetition factor associated with the group from which the first PUCCH resource is selected. The techniques include modifying transmission of the at least one additional PUCCH associated with the repetition factor of the first PUCCH, and transmitting the at least one additional PUCCH, to a base station, the at least one additional PUCCH transmitted with the repetition factor based on a preconfiguration of PUCCH resource sets including the plurality of PUCCH resources and the selection of the first PUCCH resource associated with the PRI. In some examples, the techniques in the thirty-sixth aspect may be implemented in a method or process. In some other examples, the techniques of the thirty-sixth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a thirty-seventh aspect, in combination with the thirty-sixth aspect, the at least one additional PUCCH is associated with a periodic CSI or an SPS feedback.

In a thirty-eighth aspect, in combination with the thirty-sixth aspect or the thirty-seventh aspect, the at least one additional PUCCH is associated with at least one additional PDSCH other than the first PDSCH scheduled by the DCI.

In a thirty-ninth aspect, in combination with one or more of the thirty-sixth aspect through the thirty-eighth aspect, the at least one additional PUCCH is configured based on a configuration of the first PUCCH.

In a fortieth aspect, in combination with the thirty-ninth aspect, the repetition factor of the at least one additional PUCCH is a factor of the repetition factor of the first PUCCH.

In a forty-first aspect, in combination with the thirty-sixth aspect through the fortieth aspect, the at least one additional PUCCH is configured based on a format of the at least one additional PUCCH, and different PUCCH formats of the at least one additional PUCCH have different repetition factors.

In a forty-second aspect, in combination with the thirty-sixth aspect through the forty-first aspect, the at least one additional PUCCH is configured based on a size of a UCI or based on a content of the UCI.

In a forty-third aspect, in combination with the thirty-sixth aspect through the forty-second aspect, the first PUCCH resource is selected from the first group having a first repetition factor, wherein the repetition factor of the other PUCCH resources of the first group are switched to the first repetition factor.

In a forty-fourth aspect, in combination with the thirty-sixth aspect through the forty-third aspect, the repetition factor is valid until overwritten based on another PRI.

In a forty-fifth aspect, in combination with the thirty-sixth aspect through the forty-fourth aspect, the repetition factor is valid for a time duration, where the time duration is determined based on the selected first PUCCH resource.

In some aspects, techniques for supporting a PRI may include additional aspects, such as any single aspect or any combination of aspects described below or in connection with one or more other processes or devices described elsewhere herein. In a forty-sixth aspect, techniques for supporting a PRI may include receiving downlink control information (DCI) including a physical uplink control channel (PUCCH) resource indicator (PRI) that includes a repetition indicator associated with a repetition factor, the repetition factor associated with multiple PUCCH types. The techniques also include transmitting, associated with the repetition factor, a message associated with one of the multiple PUCCH types. In some examples, the techniques in the forty-sixth aspect may be implemented in a method or process. In some other examples, the techniques of the forty-sixth aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a forty-seventh aspect, in combination with the forty-sixth aspect, the multiple PUCCH types include ACK/NACK for a scheduled PDCCH, ACK/NACK for SPS, periodic CSI on PUCCH, a SR, or a combination thereof.

In a forty-eighth aspect, in combination with the forty-sixth aspect or the forty-seventh aspect, a value of the repetition indicator indicates an index associated with, for each type of the multiple PUCCH types, a repetition factor of the type, and In a forty-ninth aspect, in combination with the forty-eighth aspect, the DCI includes a bit field associated with the index.

In a fiftieth aspect, in combination with one or more of the forty-sixth aspect through the forty-ninth aspect, the repetition factor is valid for one or more time intervals, and a duration of at least one interval of the one or more time intervals is based on a PUCCH resource set, a PUCCH format, a UCI size, UCI content, or a combination thereof.

In a fifty-first aspect, in combination with one or more of the forty-sixth aspect through the fortieth aspect, the repetition factor is based on a beam associated with PUCCH, a beam associated with PDCCH of an ACK/NACK, or a combination thereof.

In a fifty-second aspect, in combination with the fifty-first aspect, a value associated with the repetition factor indicates different repetition factors for different beams based on a configuration of a PUCCH resource set.

In a fifty-third aspect, in combination with the fifty-first aspect, the a value associated with the repetition factor is valid for PUCCHs that are associated with the same beam as the PUCCH carrying ACK/NACK for scheduled PDSCH.

In a fifty-fourth aspect, in combination with the forty-sixth aspect through the fifty-third aspect, the repetition factor indicated by the PRI is based on a PUCCH resource set, a PUCCH format, a UCI size, UCI content, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, etc., or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims.

Reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, such as "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication at a user equipment (UE), comprising:
   receiving a first configuration for downlink configuration information (DCI) that schedules a first physical downlink shared channel (PDSCH) and includes a physical uplink control channel (PUCCH) resource indicator (PRI) indicating a first repetition factor of a first PUCCH associated with the first PDSCH and at least one additional PUCCH;
   receiving a second configuration assigning a plurality of PUCCH resources into a plurality of different groups, each of the plurality of different groups associated with a different repetition factor, the plurality of different groups including at least a first group and a second group;
   receiving an indication of a selection of a first PUCCH resource from the first group or the second group, wherein selection of the first PUCCH resource switches a second repetition factor of other PUCCH resources to a third repetition factor associated with a group from which the first PUCCH resource is selected;
   modifying transmission of the at least one additional PUCCH associated with the first repetition factor of the first PUCCH; and
   transmitting the at least one additional PUCCH, to a base station, the at least one additional PUCCH transmitted with the first repetition factor based on a preconfiguration of PUCCH resource sets including the plurality of PUCCH resources and the selection of the first PUCCH resource associated with the PRI.

2. The method of claim 1, wherein the at least one additional PUCCH is associated with a periodic channel state information (CSI) or a semi-persistent scheduling (SPS) feedback.

3. The method of claim 1, wherein the at least one additional PUCCH is associated with at least one additional PDSCH other than the first PDSCH scheduled by the DCI.

4. The method of claim 1, wherein the at least one additional PUCCH is configured based on a configuration of the first PUCCH, and a fourth repetition factor of the at least one additional PUCCH is a factor of the first repetition factor of the first PUCCH.

5. The method of claim 1, wherein the at least one additional PUCCH is configured based on a format of the at least one additional PUCCH, and different PUCCH formats of the at least one additional PUCCH have different repetition factors.

6. The method of claim 1, wherein the at least one additional PUCCH is configured based on a size of an uplink control information (UCI) or based on a content of the UCI.

7. The method of claim 1, wherein the first PUCCH resource is selected from the first group having the third repetition factor, wherein the second repetition factor of the other PUCCH resources of the first group are switched to the third repetition factor.

8. The method of claim 1, wherein the first repetition factor is valid until overwritten based on another PRI.

9. The method of claim 1, wherein the first repetition factor is valid for a time duration, wherein the time duration is determined based on the selected first PUCCH resource.

10. An apparatus configured for wireless communication, comprising:
   an antenna array configured for wireless communication, the antenna array configured to:
      receive a first configuration for downlink configuration information (DCI) that schedules a first physical downlink shared channel (PDSCH) and includes a physical uplink control channel (PUCCH) resource indicator (PRI) indicating a first repetition factor of a first PUCCH associated with the first PDSCH and at least one additional PUCCH;
      receive a second configuration assigning a plurality of PUCCH resources into a plurality of different groups, each of the plurality of different groups associated with a different repetition factor, the plurality of different groups including at least a first group and a second group; and
      receive an indication of a selection of a first PUCCH resource from the first group or the second group, wherein selection of the first PUCCH resource switches a second repetition factor of other PUCCH resources to a third repetition factor associated with a group from which the first PUCCH resource is selected;
   one or more memories storing processor-executable code; and
   one or more processors coupled to the one or memories and the antenna array, the one or more processors configured to execute the code to cause the one or more processors to modify transmission of the at least one additional PUCCH associated with the first repetition factor of the first PUCCH; and
   the antenna array is further configured to transmit the at least one additional PUCCH, to a base station, the at least one additional PUCCH transmitted with the first repetition factor based on a preconfiguration of PUCCH resource sets including the plurality of PUCCH resources and the selection of the first PUCCH resource associated with the PRI.

11. The apparatus of claim 10, wherein the at least one additional PUCCH is associated with a periodic channel state information (CSI) or a semi-persistent scheduling (SPS) feedback.

12. The apparatus of claim 10, wherein the at least one additional PUCCH is associated with at least one additional PDSCH other than the first PDSCH scheduled by the DCI.

13. The apparatus of claim 10, wherein the at least one additional PUCCH is configured based on a configuration of the first PUCCH, and a fourth repetition factor of the at least one additional PUCCH is a factor of the first repetition factor of the first PUCCH.

14. The apparatus of claim 10, wherein the at least one additional PUCCH is configured based on a format of the at least one additional PUCCH, and different PUCCH formats of the at least one additional PUCCH have different repetition factors.

15. The apparatus of claim 10, wherein the at least one additional PUCCH is configured based on a size of an uplink control information (UCI) or based on a content of the UCI.

16. The apparatus of claim 10, wherein the first PUCCH resource is selected from the first group having the third repetition factor, wherein the second repetition factor of the other PUCCH resources of the first group are switched to the third repetition factor.

17. The apparatus of claim 10, wherein the first repetition factor is valid until overwritten based on another PRI.

18. The apparatus of claim 10, wherein the first repetition factor is valid for a time duration, wherein the time duration is determined based on the selected first PUCCH resource.

19. A method for wireless communication at a user equipment (UE), comprising:
   receiving downlink control information (DCI) including a physical uplink control channel (PUCCH) resource indicator (PRI) that includes a repetition indicator associated with a repetition factor of a plurality of repetition factors, each of the plurality of repetition factors associated with a PUCCH type of a plurality of PUCCH types; and
   transmitting a message associated with one of the plurality of PUCCH types based on the repetition factor.

20. The method of claim 19, wherein the plurality of PUCCH types include:
   acknowledge (ACK)/non-acknowledge (NACK) for a scheduled physical downlink control channel (PDCCH),
   ACK/NACK for semi-persistent scheduling (SPS),
   periodic channel state information (CSI) on PUCCH,
   a scheduling request (SR), or
   a combination thereof.

21. The method claim 19, wherein:
   a value of the repetition indicator indicates an index associated with, for each of the PUCCH type of the plurality of PUCCH types, a sub-repetition factor of the type, and the DCI includes a bit field associated with the index.

22. The method of claim 19, wherein the repetition factor is valid for one or more time intervals, and a duration of at least one interval of the one or more time intervals is based on a PUCCH resource set, a PUCCH format, an uplink control information (UCI) size, UCI content, or a combination thereof.

23. The method of claim 19, wherein:

the repetition factor is based on a beam associated with PUCCH, a beam associated with physical downlink control channel (PDCCH) of an ACK/NACK, or a combination thereof, and a value associated with the repetition factor indicates different repetition factors for different beams based on a configuration of a PUCCH resource set, or a value associated with the repetition factor is valid for PUCCHs that are associated with the same beam as a PUCCH carrying ACK/NACK for scheduled PDSCH.

24. The method of claim 19, wherein the repetition factor indicated by the PRI is based on a PUCCH resource set, a PUCCH format, an uplink control information (UCI) size, UCI content, or a combination thereof.

25. An apparatus configured for wireless communication, comprising:

one or more memories storing processor-executable code;

one or more processors coupled to the one or more memories; and an antenna array coupled to the one or more processors and configured for wireless communication, the antenna array configured to:

receive downlink control information (DCI) including a physical uplink control channel (PUCCH) resource indicator (PRI) that includes a repetition indicator associated with a repetition factor, the repetition factor associated with a plurality of PUCCH types; and transmit, associated with the repetition factor, a message associated with one of the plurality of PUCCH types.

26. The apparatus of claim 25, wherein the plurality of PUCCH types include:

acknowledge (ACK)/non-acknowledge (NACK) for a scheduled physical downlink control channel (PDCCH), ACK/NACK for semi-persistent scheduling (SPS), periodic channel state information (CSI) on PUCCH, a scheduling request (SR), or a combination thereof.

27. The apparatus of claim 25, wherein a value of the repetition indicator indicates an index associated with, for each type of the plurality of PUCCH types, a sub-repetition factor of the type, and the DCI includes a bit field that represents the index.

28. The apparatus of claim 25, wherein the repetition factor is valid for one or more time intervals, and a duration of at least one interval of the one or more time intervals is based on a PUCCH resource set, a PUCCH format, an uplink control information (UCI) size, UCI content, or a combination thereof.

29. The apparatus of claim 25, wherein:

the repetition factor is based on a beam associated with PUCCH, a beam associated with physical downlink control channel (PDCCH) of an ACK/NACK, or a combination thereof, and a value associated with the repetition factor indicates different repetition factors for different beams based on a configuration of a PUCCH resource set, or the value of associated with the repetition factor that is valid for PUCCHs that are associated with the same beam as a PUCCH carrying ACK/NACK for scheduled PDSCH.

30. The apparatus of claim 25, wherein the repetition factor indicated by the DCI is based on a PUCCH resource set, a PUCCH format, an uplink control information (UCI) size, UCI content, or a combination thereof.

* * * * *